(12) United States Patent
Fozunbal

(10) Patent No.: US 8,204,249 B2
(45) Date of Patent: Jun. 19, 2012

(54) METHODS AND SYSTEMS FOR REDUCING ACOUSTIC ECHOES IN MULTICHANNEL AUDIO-COMMUNICATION SYSTEMS

(75) Inventor: Majid Fozunbal, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1155 days.

(21) Appl. No.: 11/799,266

(22) Filed: Apr. 30, 2007

(65) Prior Publication Data

US 2008/0267420 A1   Oct. 30, 2008

(51) Int. Cl.
*H04B 15/00* (2006.01)
*H04R 3/00* (2006.01)
*H04R 27/00* (2006.01)
(52) U.S. Cl. ............... 381/93; 381/95; 381/96; 381/83
(58) Field of Classification Search ............... 381/63, 381/83, 93, 95, 96, 121, 318; 379/406.1, 379/406.08
See application file for complete search history.

(56) References Cited

U.S. PATENT DOCUMENTS 6,553,122 B1 * 4/2003 Shimauchi et al. ........... 381/66
2002/0159603 A1 * 10/2002 Hirai et al. ............... 381/61

FOREIGN PATENT DOCUMENTS

| EP | 1406397 A1 | 4/2004 |
|---|---|---|
| JP | 2003-102085 | 4/2003 |
| JP | 2006-121589 | 5/2006 |
| KR | 10-1999-0080327 | 11/1999 |
| KR | 10-2000-0065243 | 11/2000 |

OTHER PUBLICATIONS

Japanese Office Action dated Jun. 14, 2011 ~ Patent Application No. 2010-506328.

* cited by examiner

*Primary Examiner* — Devona Faulk
*Assistant Examiner* — George Monikang

(57) ABSTRACT

Various embodiments of the present invention are directed to adaptive real-time, acoustic echo cancellation methods and systems. One method embodiment of the present invention is directed to reducing acoustic echoes in microphone-digital signals transmitted from a first location to a second location. The first location includes a plurality of loudspeakers and microphones, each microphone produces one of the microphone-digital signals including sounds produced at the first location and acoustic echoes produced by the loudspeakers. The method includes determining approximate impulse responses, each of which corresponds to an echo path between the microphones and the loudspeakers. The method includes determining a plurality of approximate acoustic echoes, each approximate acoustic echo corresponds to convolving a digital signal played by one of the loudspeakers with a number of the approximate impulse responses. The acoustic echo in at least one of the microphone-digital signals is reduced based on the corresponding approximate acoustic echo.

18 Claims, 22 Drawing Sheets

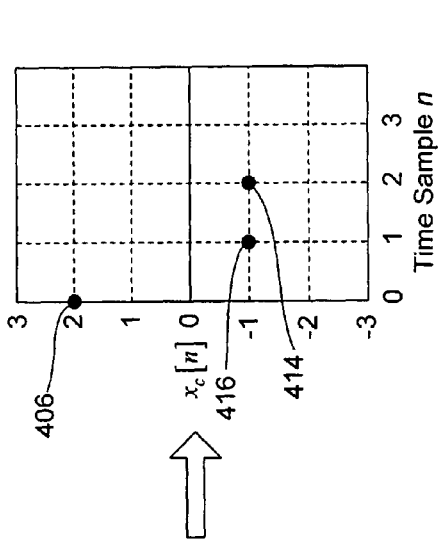
*Figure 4C*
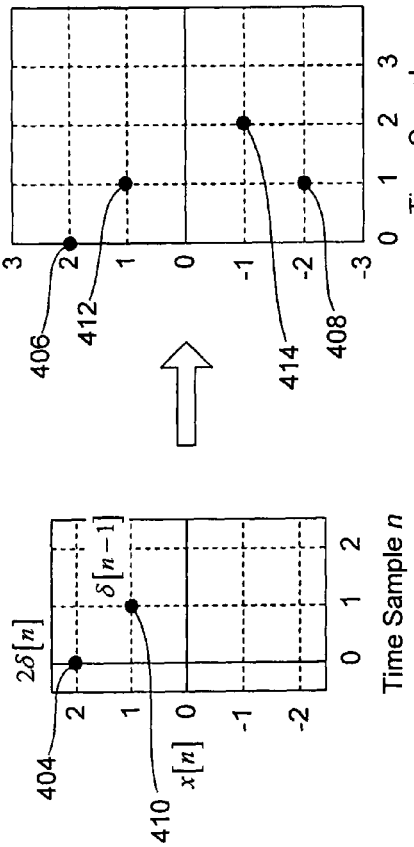
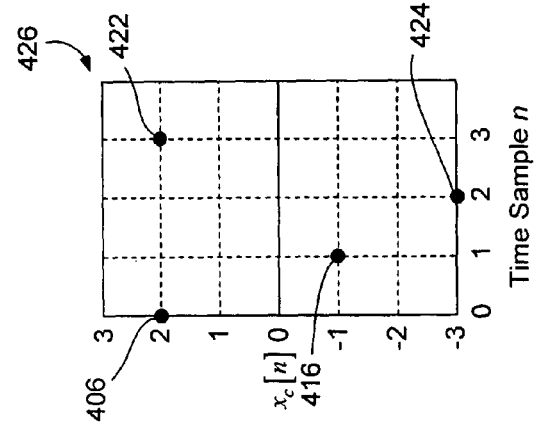
*Figure 4D*
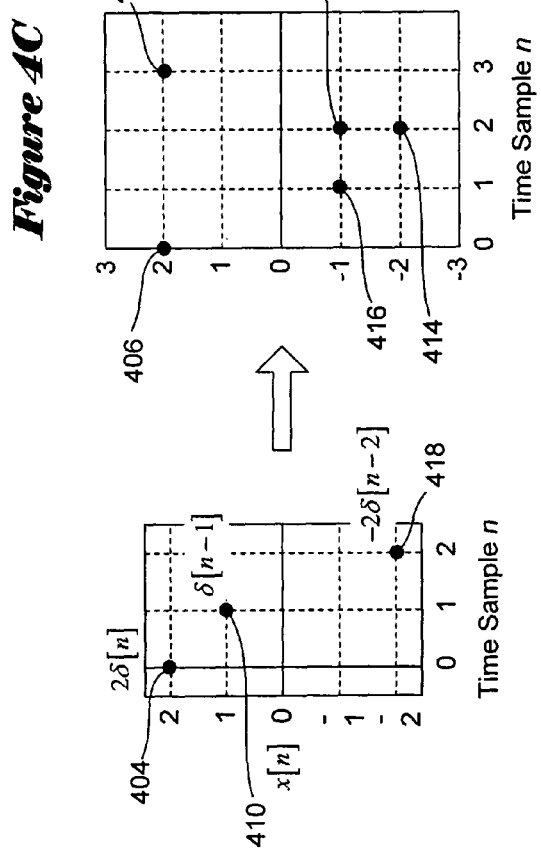

METHODS AND SYSTEMS FOR REDUCING ACOUSTIC ECHOES IN MULTICHANNEL AUDIO-COMMUNICATION SYSTEMS

TECHNICAL FIELD

The present invention is related to acoustic echo cancellation, and, in particular, to methods and systems for reducing acoustic echoes in multichannel audio-communication systems.

BACKGROUND OF THE INVENTION

Increasing interest in communication media, such as the Internet, electronic presentations, voice mail, and audio-conference communication systems, is increasing the demand for high-fidelity audio and communication technologies. Currently, individuals and businesses are using these communication media to increase efficiency and productivity, while decreasing cost and complexity. For example, audio-conference communication systems allow one or more individuals at a first location to simultaneously converse with one or more individuals at other locations through full-duplex communication lines in nearly real time, without wearing headsets or using handheld communication devices.

In many audio-conference communication systems, audio signals carry a large amount of data, and employ a broad range of frequencies. Modern audio-conference communication systems attempt to provide clear transmission of audio signals over a single channel, also called a "monochannel," free from perceivable distortion, background noise, and other undesired audio artifacts. One common type of undesired audio artifact is an acoustic echo. Acoustic echoes can occur when a transmitted audio signal loops through an audio-conference communication system due to the coupling of a microphone and a speaker at a location. FIG. 1 shows a schematic diagram of an exemplary, two-location, monochannel audio-conference communication system 100. The audio-conference communication system 100 includes a near room 102 and a far room 104. Sounds, such as voices, produced in the near room 102 are detected by a microphone 106, and sounds produced in the far room 104 are detected by a microphone 108. Microphones 106 and 108 convert sounds into signals represented by x(t) and y(t), respectively, where t represents time.

The microphone 106 can detect many different sounds produced in the near room 102, including sounds output by a loudspeaker 114. An analog signal produced by the microphone 106 is represented by:

$$y(t) = s(t) + f(x(t)) + v(t)$$

where
s(t) is an analog signal representing sounds produced in the near room 102,
v(t) is an analog signal representing noise, or extraneous signals created by disturbances in the microphone or communication channel 110, that, for example, may produce an annoying buzzing sound output from the loudspeaker 116, and
f(x(t)) is an analog signal representing an acoustic echo. The acoustic echo f(x(t)) is due to both acoustic propagation delay in the near room 102 and a round-trip transmission delay of the analog signal x(t) over the communication channels 110 and 112. Sounds generated by the analog signal y(t) are output from a loudspeaker 116 in the far room 104. Depending on the amplification, or gain, in the amplitude of the signal y(t) and the magnitude of the acoustic echo f(x(t)), a person speaking into the microphone 108 in the far room 104 may hear, in addition to the sounds carried by the signal s(t), an echo or an annoying, high-pitched, howling sound emanating from the loudspeaker 116 as a result of the sound generated by the acoustic echo f(x(t)). Designers and manufacturers of audio-conference communication systems have attempted to compensate for acoustic echoes in various ways. One compensation technique employs a filtering system that reduces the acoustic echo. Typically, filtering systems employ adaptive filters that adapt to changing conditions at an audio-signal-receiving location.

In recent years there has been an increasing interest in developing multichannel audio communication systems in an effort to enhance the audio-conference experience. These systems employ a plurality of microphones and loudspeakers at the first and second locations. However, employing a plurality of microphones and loudspeakers at each location creates acoustic echoes that are separated by several hundred milliseconds of communication delay, which is an obstacle to deploying multichannel audio-conference communication systems. For example, designers and manufacturers have developed methods that employ nonlinear functions to uncorrelated excitation signals prior to exciting the loudspeakers. However, this nonlinearity ultimately diminishes the spatial audio experience. Designers, manufacturers, and users of audio-conference communication systems have recognized a need for multichannel audio-conference communication methods and systems that can reliably remove an acoustic echo from audio signals in real-time, and can rapidly adapt to the changing conditions at audio-signal-receiving locations.

SUMMARY

Various embodiments of the present invention are directed to adaptive real-time, acoustic echo cancellation methods and systems. One method embodiment of the present invention is directed to reducing acoustic echoes in a plurality of microphone-digital signals transmitted from a first location to a second location. The first location includes a plurality of loudspeakers and a plurality of microphones, each of the plurality of microphones produces one of the plurality of microphone-digital signals that includes sounds produced at the first location and acoustic echoes produced by the plurality of loudspeakers. The method includes determining approximate impulse responses, each approximate impulse response corresponds to an echo path between each of the plurality of microphones and each of the plurality of loudspeakers. The method also includes determining a plurality of approximate acoustic echoes, each approximate acoustic echo corresponds to convolving a digital signal played by one of the plurality of loudspeakers with a number of the approximate impulse responses. The acoustic echo in at least one of the microphone-digital signals is reduced based on the corresponding approximate acoustic echo.

BRIEF DESCRIPTION OF THE DRAWINGS

FIGS. 4A-4D illustrate an example of determining a digital signal output from a microphone by convolving an input digital signal with the microphone impulse response.

Figure 10:
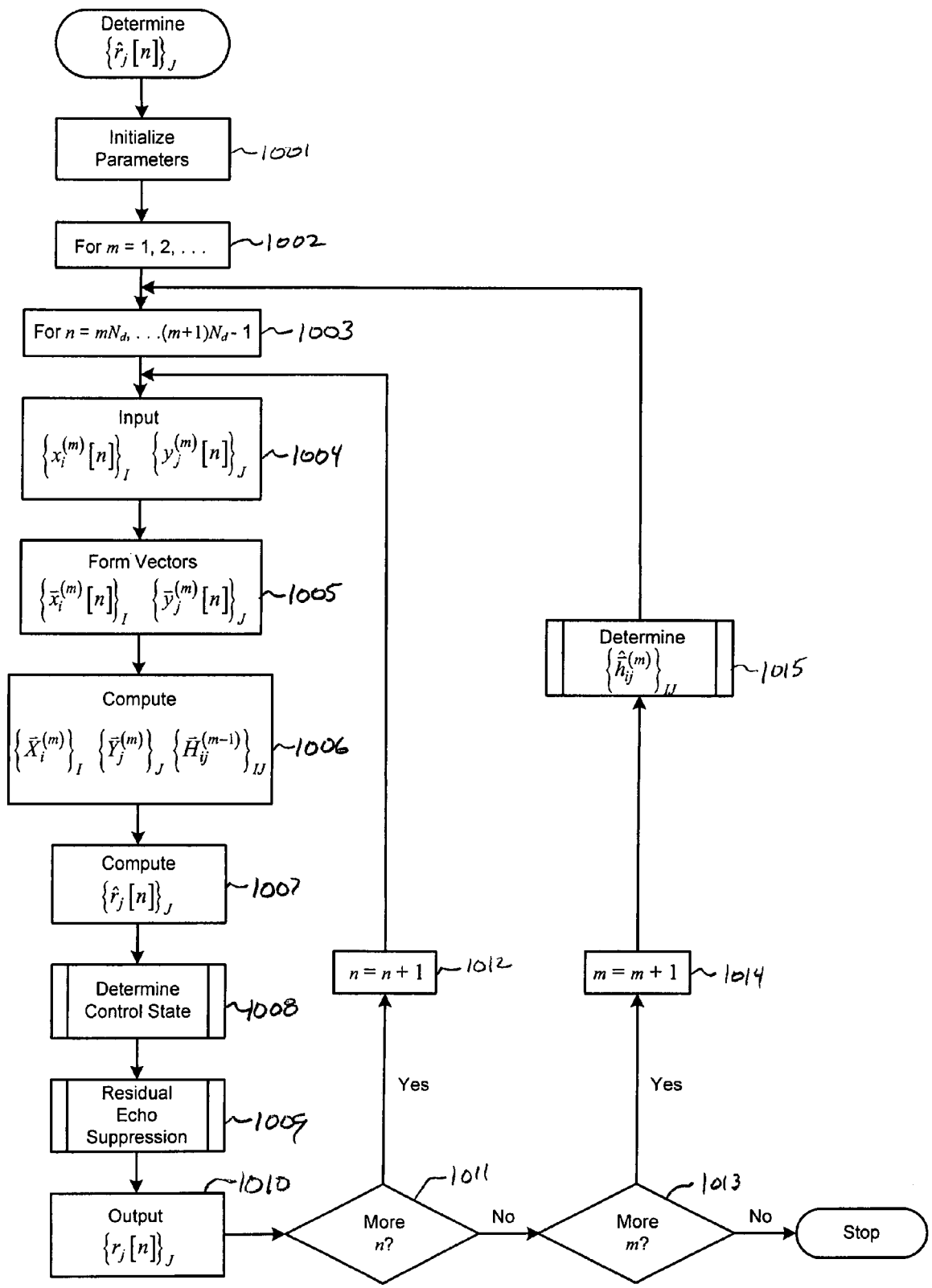
FIG. 10 shows a control-flow diagram that represents an embodiment of the present invention for reducing acoustic echoes in a plurality of audio signals transmitted from a first location to a second location.

called in step 1015 in FIG. 10 and represents an embodiment of the present invention.

Figure 13A:
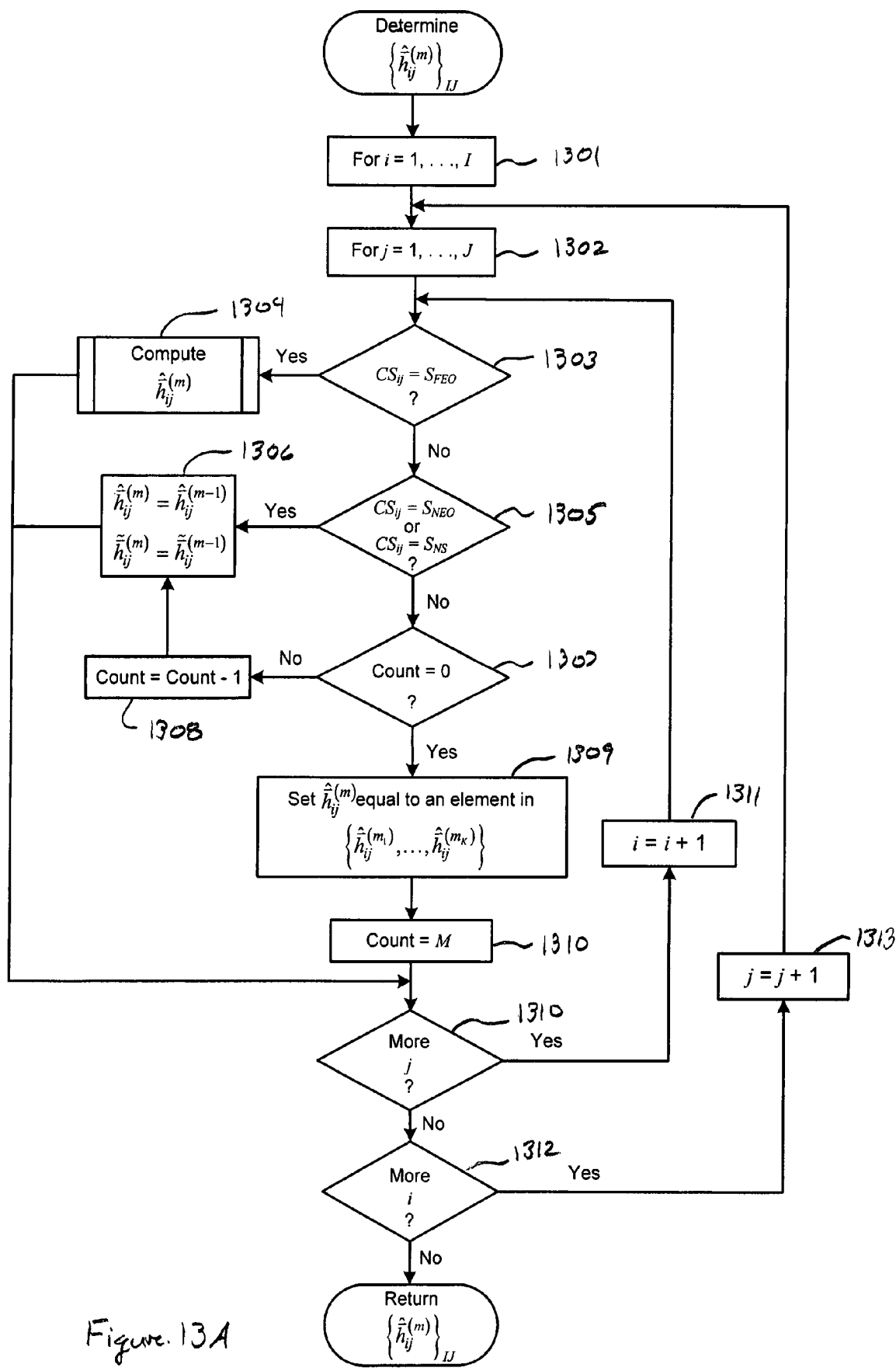
FIG. 13A is a control-flow diagram for the routine "determine $$\{\hat{h}_{ij}^{(m)}\}_{IJ}"$$
Figure 13:
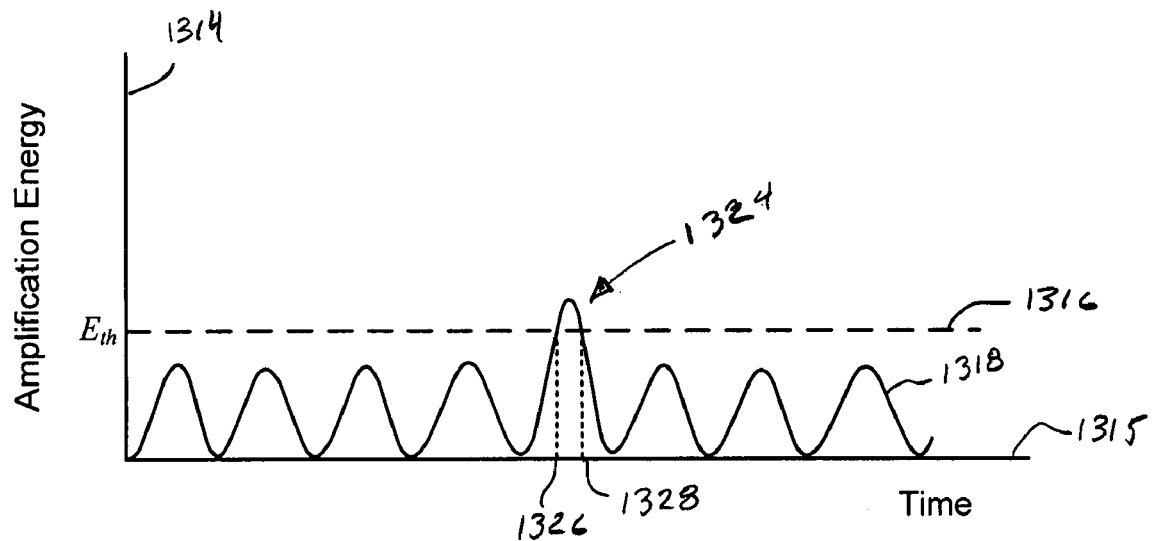
Figure 13C:
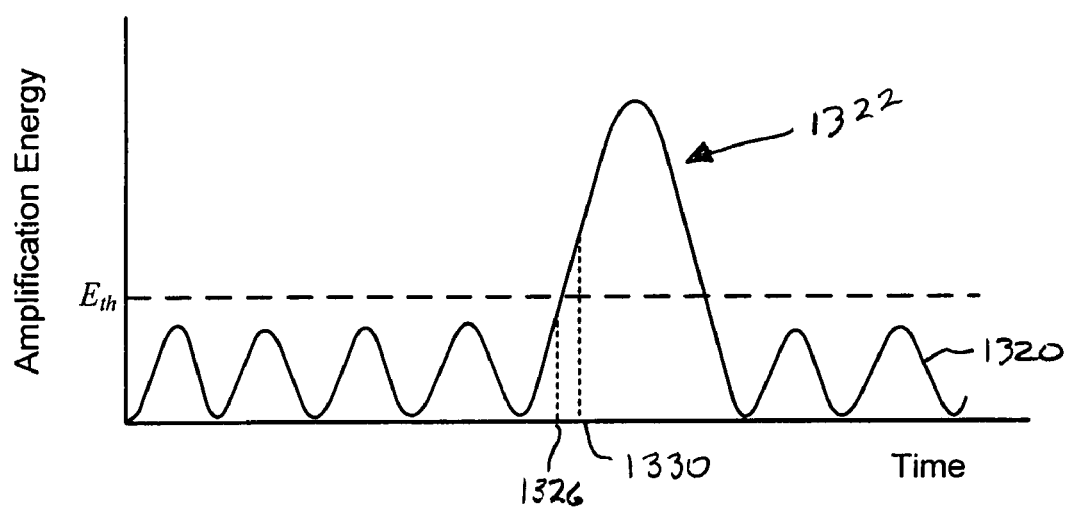

FIGS. 13B-13C shows two plots of amplification energy versus time for the four types of control states that represents an embodiment of the present invention.

Figure 14A:
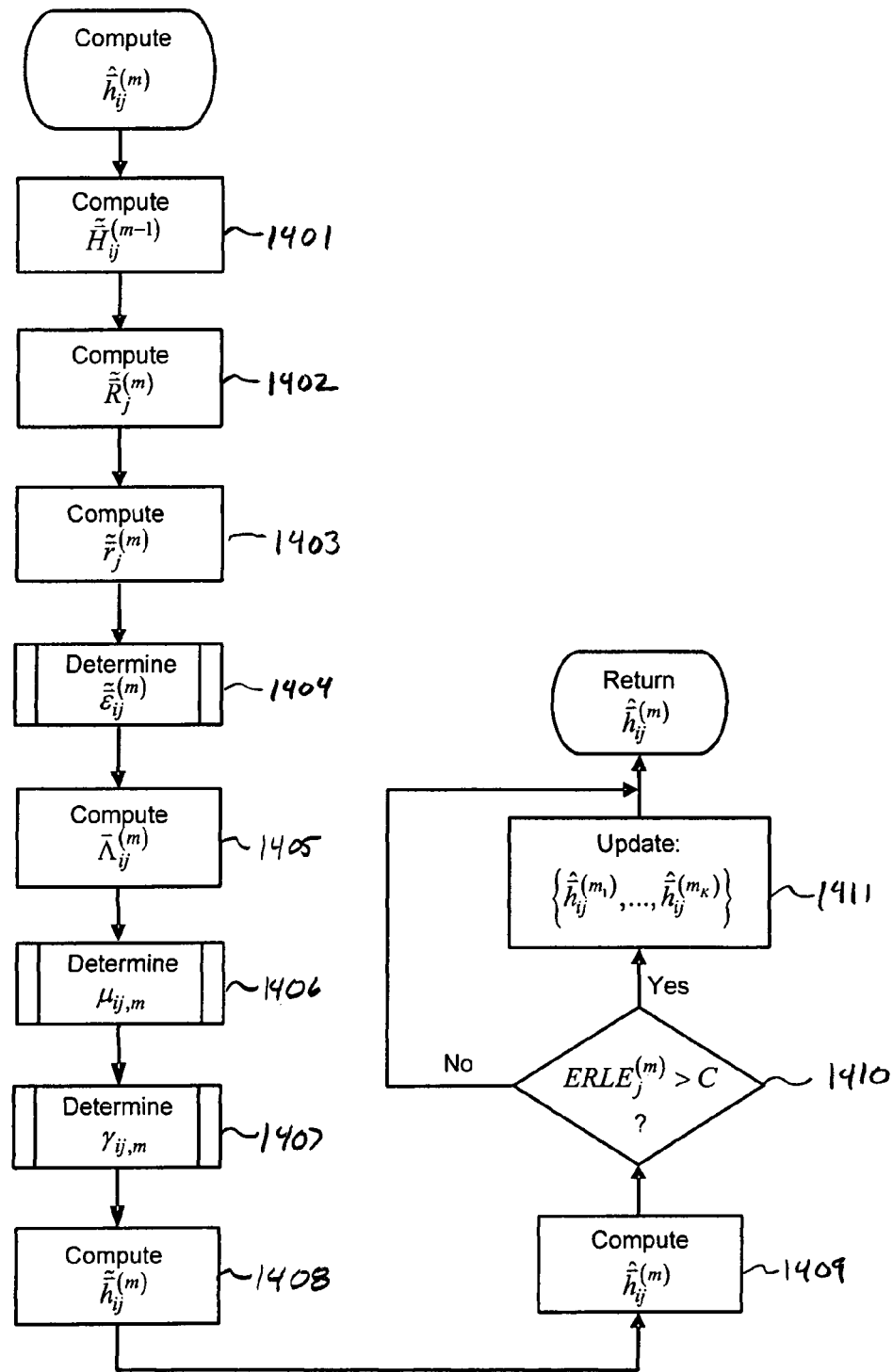

FIG. 14A is a control-flow diagram for the routine "compute $$\hat{h}_{ij}^{(m)}"$$

called in step 1304 in FIG. 14 and represents an embodiment of the present invention.

Figure 14B:
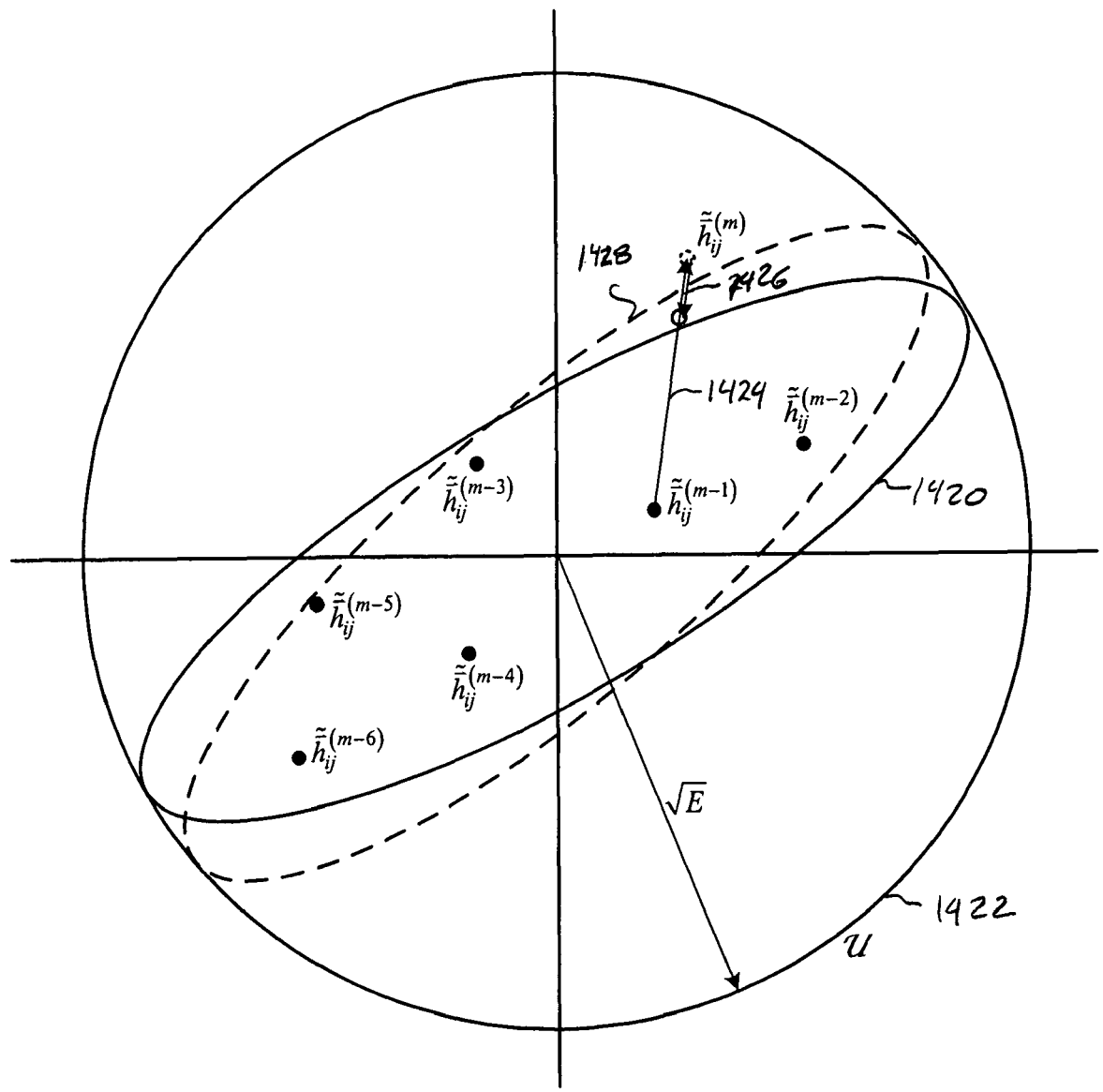

FIG. 14B shows a two-dimensional illustration of a hyper-elliptical region located within a search space that represents an embodiment of the present invention.

Figure 15:
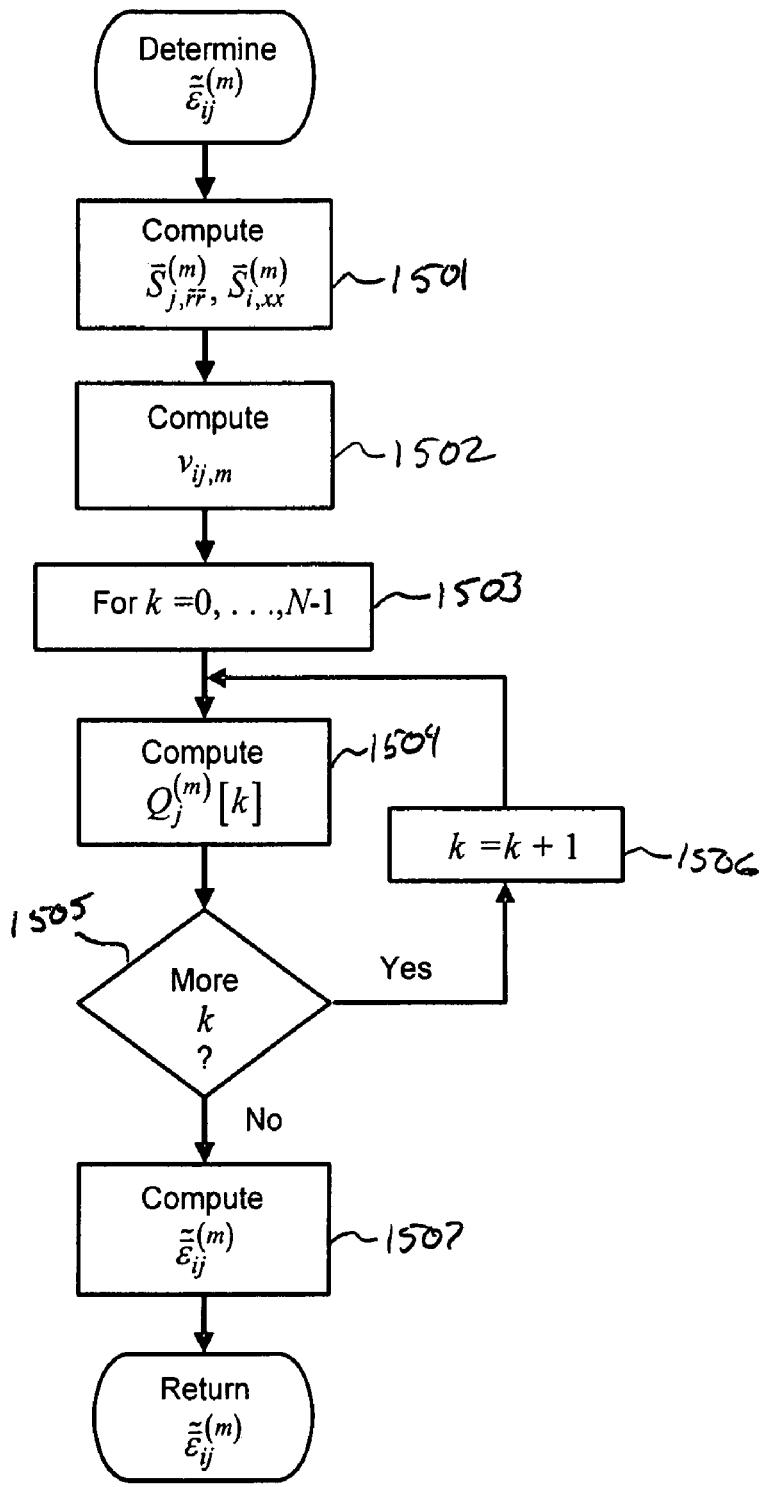

FIG. 15 is a control-flow diagram for the routine "determine $$\tilde{\varepsilon}_{ij}^{(m)}"$$

called in step 1404 in FIG. 14 and represents an embodiment of the present invention.

Figure 16:
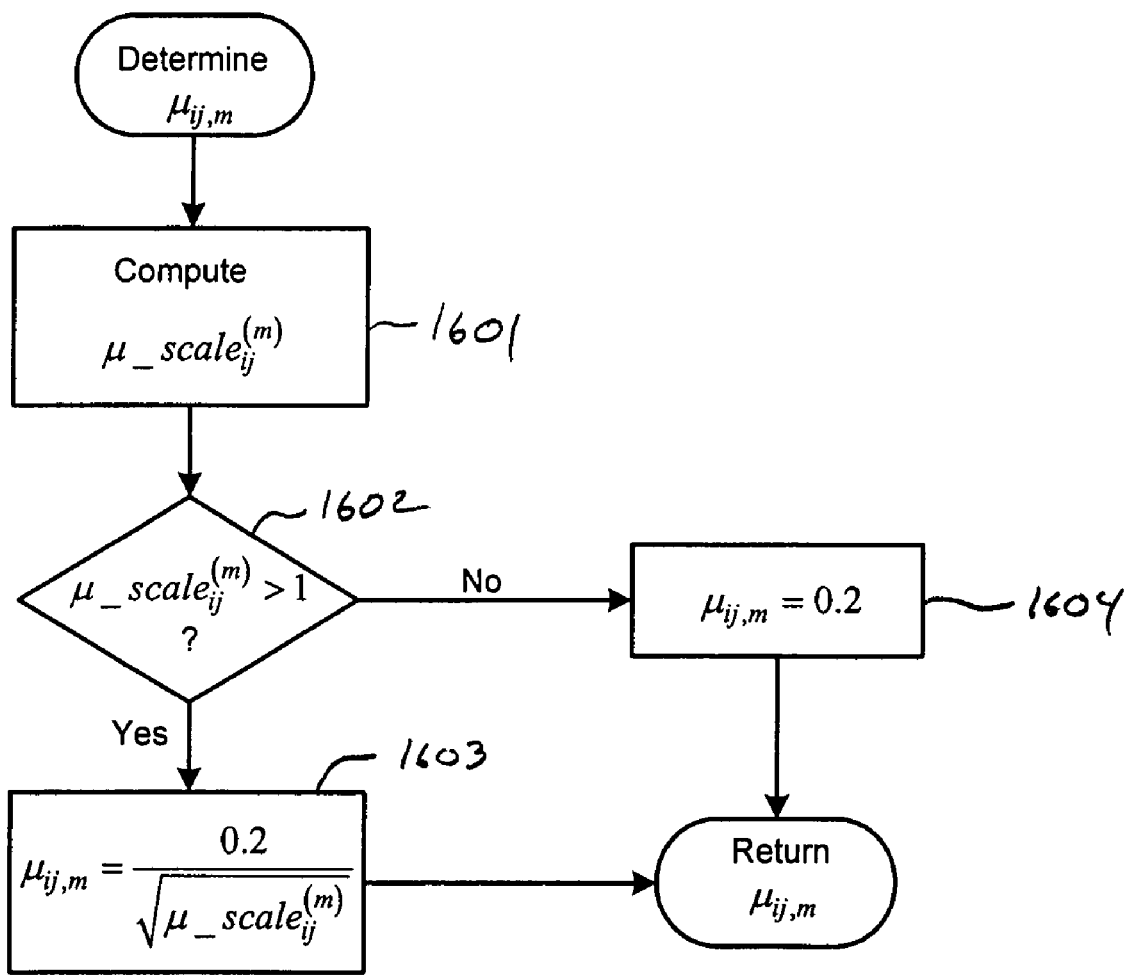

FIG. 16 is a control-flow diagram for the routine "determine $\mu_{ij,m}$," called in step 1406 in FIG. 14 that represents an embodiment of the present invention.

Figure 17:
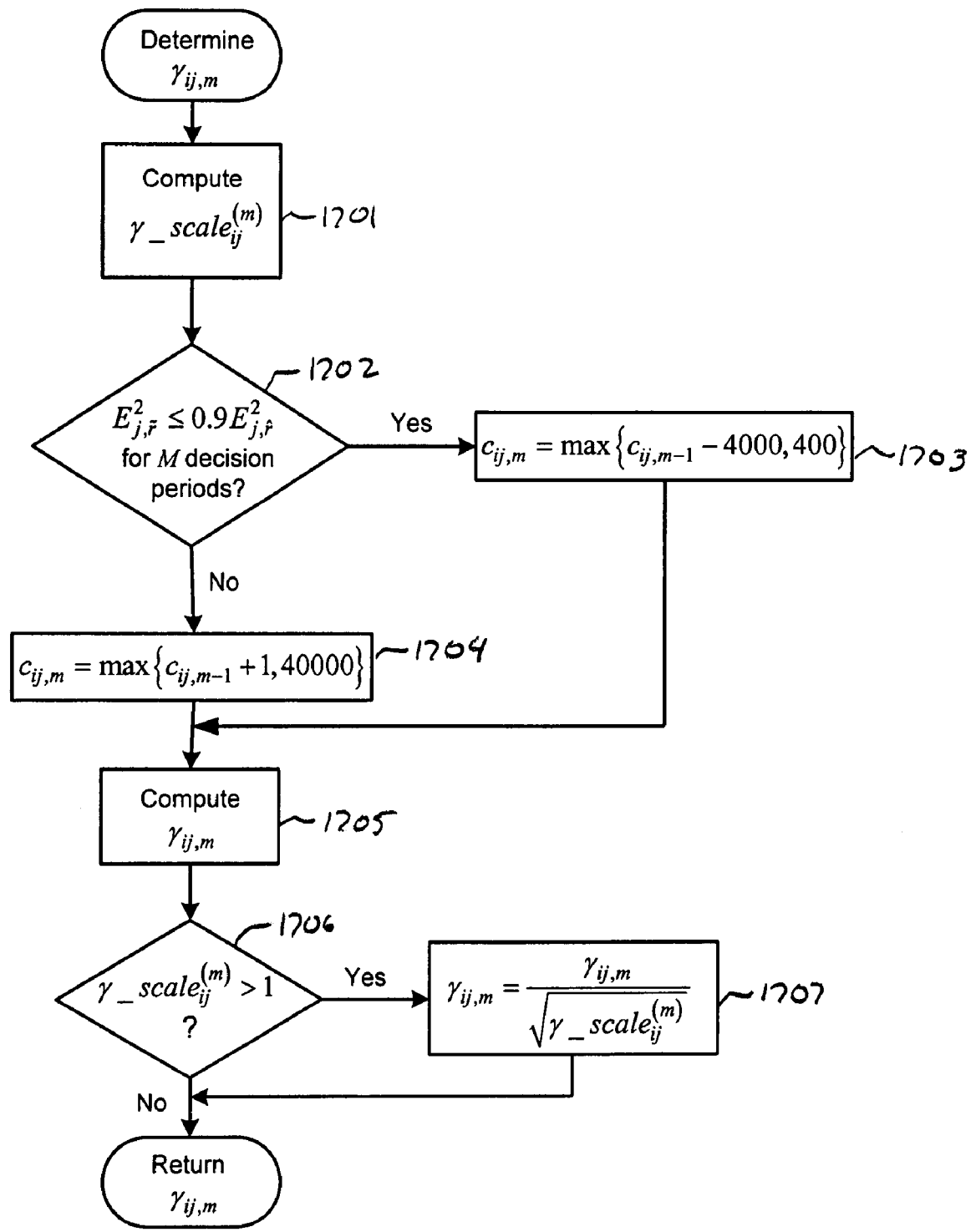

FIG. 17 is a control-flow diagram for the routine "determine $\gamma_{ij,m}$," called in step 1407 in FIG. 14 that represents an embodiment of the present invention.

DETAILED DESCRIPTION OF THE INVENTION

Various embodiments of the present invention are directed to real-time, adaptive acoustic echo cancellation methods in multichannel audio-communication systems. In particular, these methods reduce acoustic echoes in a plurality of audio signals transmitted between a first location and a second over multichannel audio-communication systems. The communication system embodiments of the present invention can be electronic presentations, voice mail, audio-conference communication systems or any other type of communication system capable of transmitting audio signals between a first location and a second location. A plurality of microphones and loudspeakers are employed at the first location and the second location. Method embodiments of the present invention compute a control state for each acoustic coupling between microphones and loudspeakers. The control state characterizes one of the following four types of communications: (1) sound transmitted from the first location only; (2) sound transmitted from the second location only; (3) sounds transmitted simultaneously between the first and second locations; and (4) no sound transmitted between the first and second locations. For each of the signals detected by the microphones located at the first location, the methods then compute approximate acoustic echoes based on the control state. The methods subtracts the corresponding computed, approximate acoustic echoes from each of the digital signals that are transmitted from the second location to the first location and adjusts these signals for gain before the signals are output at the first location.

Embodiments of the present invention are mathematical in nature and, for this reason, are described below with reference to numerous equations and graphical illustrations. Although mathematical expressions, alone, may be sufficient to fully describe and characterize embodiments of the present invention to those skilled in the art of acoustic echo cancellation, the more graphical, problem oriented examples, and control-flow-diagram approaches included in the following discussion are intended to illustrate just one of many embodiments of the present invention so that the present invention may be accessible to readers with various backgrounds. In order to assist in understanding descriptions of various embodiments of the present invention, an overview of digital signals, impulse responses, and convolution is provided in a first subsection. Embodiments of the present invention are provided in a second subsection.

An Overview of Digital Signals, Impulse Responses, and Convolution

This subsection is intended to provide a general description of digital signals, impulse responses, and convolution in a monochannel audio transmission system. The concepts introduced in this subsection are then used to describe each of the audio channels in a multichannel acoustic echo embodiments described below in the next subsection. The term "microphone" refers to a transducer or any suitable device that converts sounds into signals. The "loudspeaker" refers to any suitable device capable of converting a signal into sound.

Sounds received by a microphone are transformed into an analog signal comprising a time-dependent, continuously varying voltage. In order to process an analog signal using a digital computer, the analog signal is first converted into a digital signal with minimal alteration of the essential information contained in the analog signal. Digital signals can be stored electronically, magnetically, or optically and can be processed using logical operations encoded in computer programs.

Figure 1:
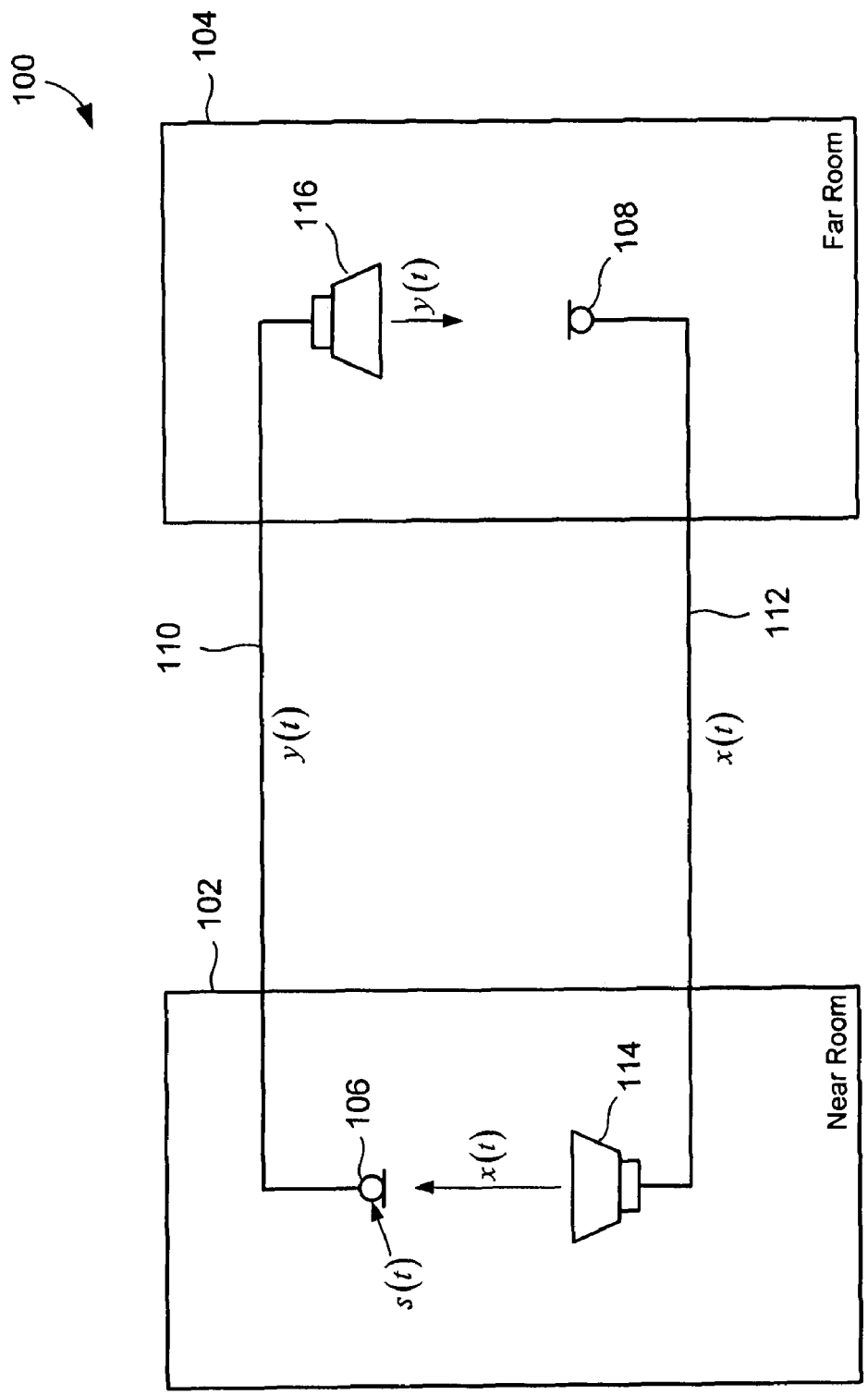
FIG. 1 shows a schematic diagram of an exemplary, two-location, audio-conference communication system.
Figure 2A:
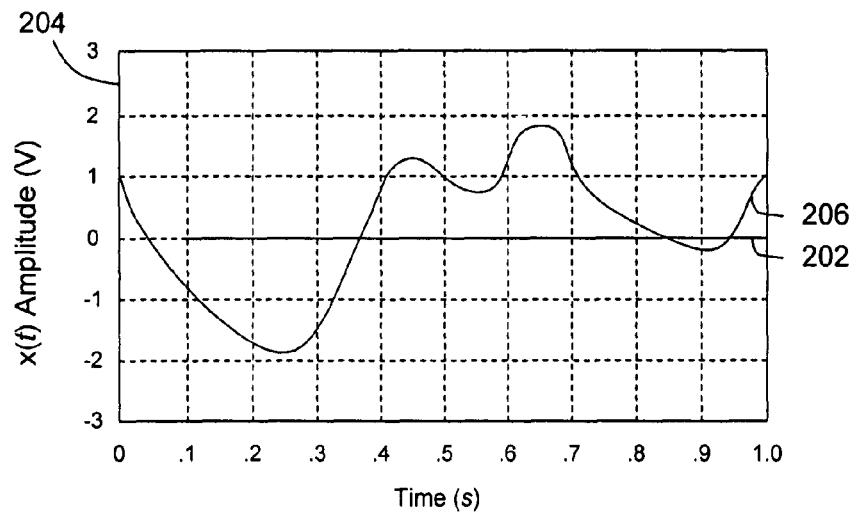
FIGS. 2A-2C illustrate conversion of an analog signal to a digital signal.
Figure 2B:
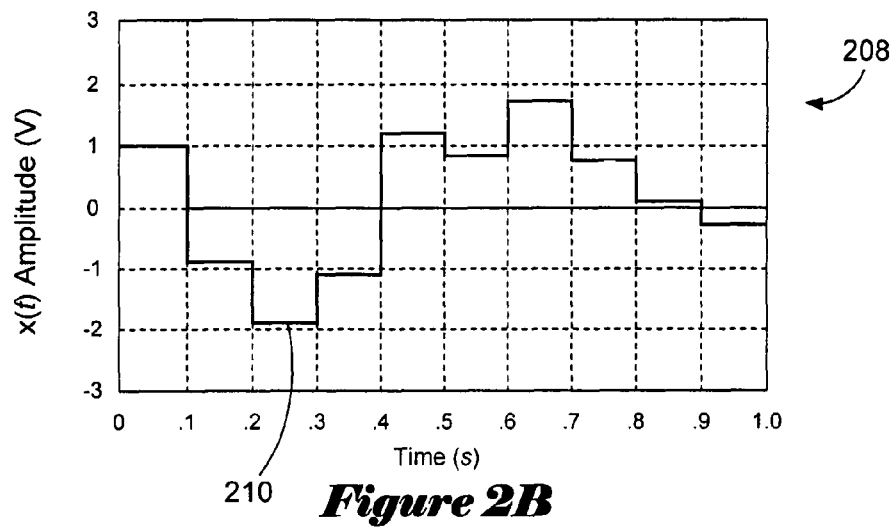
Figure 2C:
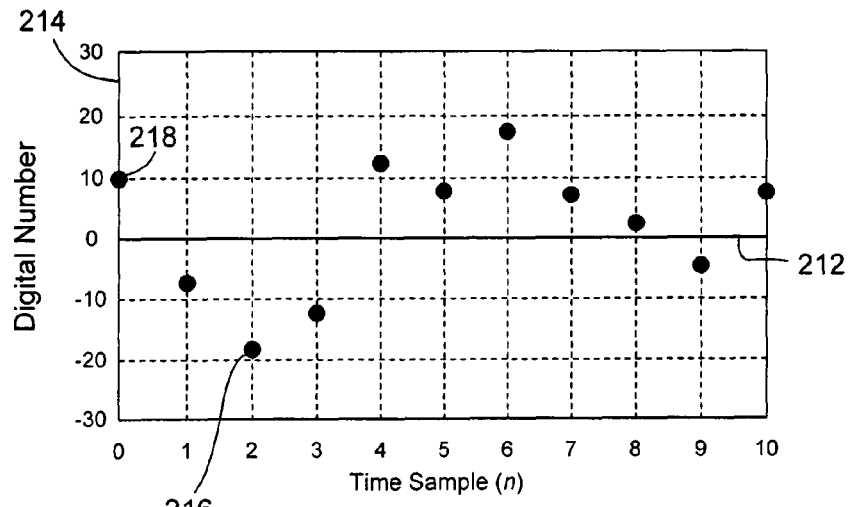

FIGS. 2A-2C illustrate conversion of an analog signal into a digital signal. In FIGS. 2A-2B, horizontal axes, such as horizontal axis 202, represent time, and vertical axes, such as vertical axis 204, represent analog signal amplitudes in volts. FIG. 2A is a plot of a time-dependent, continuously-varying analog signal x(t) 206. The analog signal x(t) 206 is first sampled by measuring the amplitude of the analog signal x(t) at discrete sampling times. In order to prevent loss of essential information contained in the analog signal, the duration between sampling times is generally selected to be sufficiently short so that the analog signal varies little between consecutive sampling times. FIG. 2B is a plot of a sampled signal 208 obtained by sampling the analog signal 206 in FIG. 2A. The sampling times are in tenths of a second, and the sampled signal 208 is approximated as a step function by assuming a constant-signal amplitude between sampling times. For example, a constant-amplitude region 210 represents a constant value of −1.9 volts between sampling times 0.2 and 0.3 seconds.

For efficient and convenient digital signal processing, it is desirable for both time and magnitude values to be integers. Therefore, an integer-encoded, digital signal is produced by multiplying the value of each constant-amplitude region by a first constant and by multiplying the sampling times by a second constant in order to produce integer values that represent the amplitude and sampling times of each step in the step function. An integer-valued sampling time is called a "time sample," and an integer-valued amplitude is called a "digital amplitude." The resulting digital signal can be functionally represented by x[n], where n, an independent variable, represents a time sample domain. FIG. 2C is a plot of a digital signal obtained from the sampled signal 208 in FIG. 2B. In FIG. 2C, horizontal axis 212 is a time sample domain, and vertical axis 214 is a digital signal axis. Each point in the graph represents a quantized value representing the scaled amplitude of the digital signal at a scaled sampling time. For example, point x[2] 216 with coordinates (2,−19) represents step 210 in FIG. 2B.

A digital signal x[n] can, in general, be thought of as a series of impulses, each impulse corresponding to a unique component. The notation x[n], where n represents a particular time sample, can also be used to represent a single impulse of a digital signal which is called a "component" of a digital signal. Each component is a signal comprising all zero sample values except for a single value representing the amplitude at a single time sample, which is mathematically represented by:

$$x[n]=d\delta[n-p]$$

where d is an integer scale factor that represents the amplitude, or strength, of the impulse, p is a time sample, and δ is the delta function defined by:

$$\delta[n-p] = \begin{cases} 1 & \text{when } n = p \\ 0 & \text{otherwise} \end{cases}$$

For example, in FIG. 2C, the component x[0] 218 is equal to 10δ[p], and the component x[2] 216 is equal to −19δ[2−p]. In other words, p in the delta function δ[n−p] represents a time sample shift, and n−p represents a time sample relative to time sample n.

A digital impulse response, h[n], is a digital signal that is output from a microphone when the input to the microphone is a unit impulse δ[n], where p is "0" and d equals "1." The impulse response of a microphone can be determined by applying an impulse of sound with a very short duration to the microphone and measuring the signal output by the microphone. The impulse response of the microphone can also be represented by a vector as follows:

$$h[n] = \vec{h}_n = \begin{bmatrix} h_n[0] \\ h_n[1] \\ \vdots \\ h_n[L-1] \end{bmatrix}$$

where $h_n[\cdot]$ is an impulse response component, and

L is the number of components comprising the impulse response.

Figure 3:
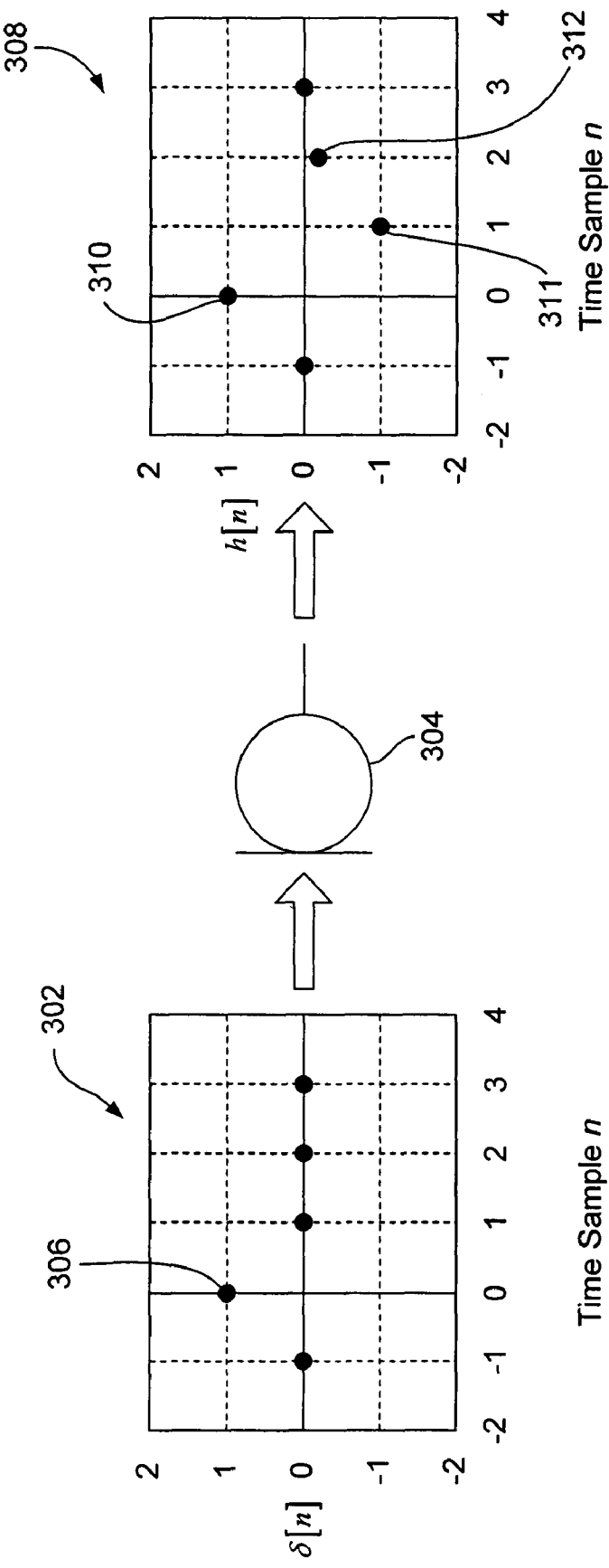
FIG. 3 is a plot of an impulse excitation of a loudspeaker and a plot of an overall room impulse response resulting at the output of the microphone in response to the impulse excitation.

FIG. 3 shows a plot of an impulse x[n] and a plot of an overall room impulse response h[n] produced in response to the impulse x[n]. The impulse response h[n] includes the sound impulse produced by the loudspeaker and the sound of the impulse reflected in the room and received by microphone. In FIG. 3, impulse plot 302 represents an impulse x[n] input to a hypothetical microphone 304. The impulse x[n] 302 comprises all zeros except for a single nonzero point 306 at n equal to 0 which is represented by dδ[n−p]. In this case, d equals "1" and p equals "0" so the impulse can be represented as δ[n]. In response to the impulse 302, the microphone 304 outputs an impulse response h[n] that is represented by an impulse-response plot 308. The impulse response 308 comprises all zeros except for the three nonzero digital signals represented by points 310-312. An actual digital impulse response to an impulse typically comprises a greater number of nonzero components than contained in the impulse, as shown in FIG. 3. Impulse response 308 can be represented by the 3-component vector:

$$h[0] = \vec{h}_0 = \begin{bmatrix} h_0[0] \\ h_0[1] \\ h_0[2] \end{bmatrix} = \begin{bmatrix} 1 \\ -1 \\ -.25 \end{bmatrix}$$

Figure 4A:
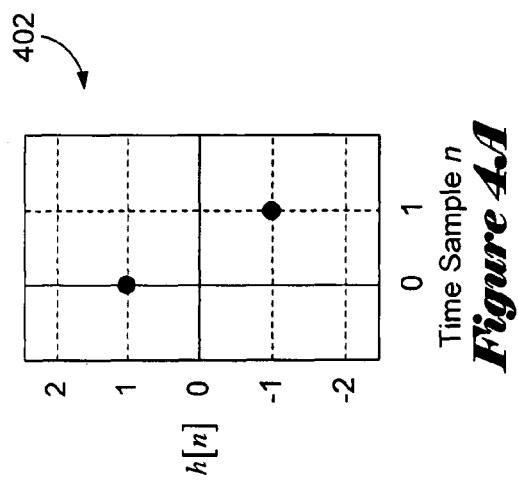

Typically, the impulse used to determine an impulse response is output from a loudspeaker into a room and is detected by a microphone. The loudspeaker, room, and microphone are referred to as a "system," and an associated impulse response can be referred to as a "system impulse response." A digital signal produced by the loudspeaker of the system is determined by convolving a digital signal x[n] representing the sound produced by the loudspeaker with the impulse response h[n] of the system. The convolved digital signal is represented by $x_c[n]$. FIGS. 4A-4D provide a graphical example of convolving a three-component digital signal x[n] produced by a hypothetical loudspeaker with an impulse response h[n] in order to produce a digital signal $x_c[n]$ output from the system. FIG. 4A is a plot of an example, two-component, impulse response h[n] 402 that is produced by the hypothetical system. The impulse response h[n] is assumed to be invariant with time.

Figure 4B:
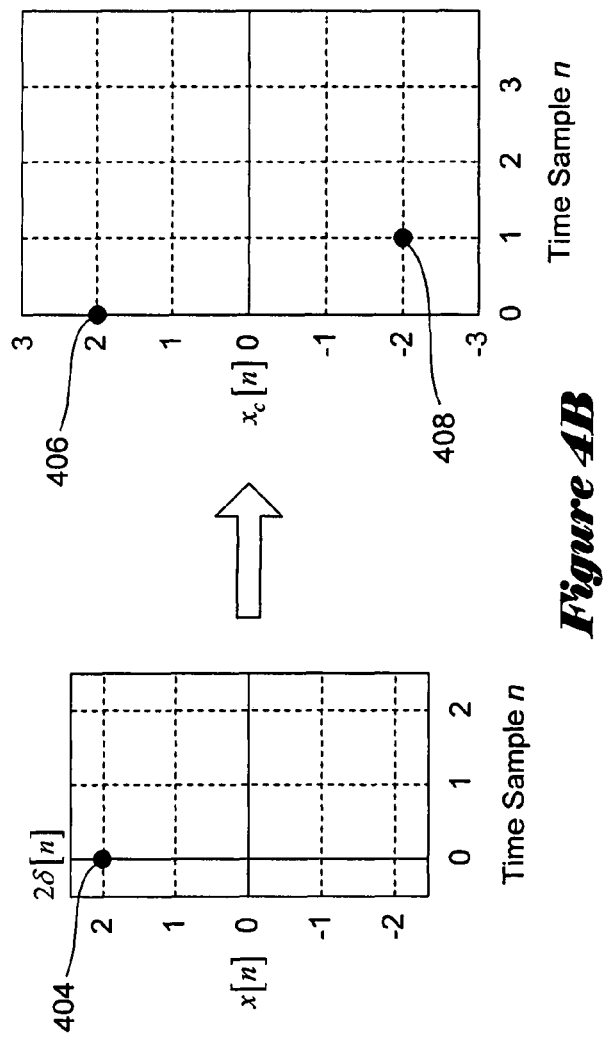

FIG. 4B is a plot of a first component of the digital signal x[n] at a time sample "0." The first component is represented by a scaled impulse $2\delta[0]$ 404. In response to the impulse $2\delta[n]$ 404, the system outputs an impulse-response h[n] comprising a first component 406 at the time sample "0," and outputs a second component 408 at a later time sample "1." The impulse response to the impulse $2\delta[n]$ 404 is essentially the impulse response in FIG. 4A with the components multiplied by the impulse scale factor "2."

FIG. 4C is a plot of a second component of the digital signal x[n] that is input to the system at the later time sample "1." The second component is represented by an impulse $\delta[n-1]$ 410. In response to the impulse $\delta[n-1]$ 410, the system outputs an impulse-response comprising a third component 412 at the time sample "1," and outputs a fourth component 414 at a later time sample "2." The impulse response to the impulse $\delta[n-1]$ 410 is essentially the impulse response in FIG. 4A with the component time samples shifted by a factor of "1." Because the second and the third components 408 and 412 occur at the same time sample "1," the amplitudes of the components 408 and 412 are summed in order to obtain a fifth component 416, which is the output at the time sample "1."

FIG. 4D is a plot of a third component of the digital signal x[n] that is input to the system at the time sample "2." The second component is represented by an impulse $-2\delta[n-2]$ 418. In response to the impulse $-2\delta[n-2]$, the system outputs an impulse response comprising a sixth component 420 at the time sample "2," and a seventh component 422 at a later time sample "3." The impulse response to the impulse $-2=[n-2]$ 418 is essentially the impulse response in FIG. 4A with the components multiplied by the scale factor "−2," and the component time samples shifted by a factor of "2." Because the fifth and the sixth components 414 and 420 occur at the same time sample "2," the amplitudes of components 414 and 420 are summed to give an eighth component 424, which is the output at the time sample "2."

Note that convolving the three-component, input digital signal x[n] with the two-component impulse response h[n] outputs the four-component digital signal $x_c[n]$. In general, convolving an N component input digital signal x[n] with an L component impulse response h[n] gives an N+L−1 component convolved digital signal $x_c[n]$.

Components of the convolved digital signal $x_c[n]$ 426, in FIG. 4D, can also be obtained by calculating the scalar or dot product of a two-component vector representation of the impulse response and two-component vectors corresponding to each component of the digital signal x[n] that are given by:

$$\vec{h} = \begin{bmatrix} h[0] \\ h[1] \end{bmatrix} = \begin{bmatrix} 1 \\ -1 \end{bmatrix}, \text{ and } \vec{x}[n] = \begin{bmatrix} x[n] \\ x[n-1] \end{bmatrix}$$

The order of the components in the column vectors $\vec{h}$ and $\vec{x}[n]$ are opposite in time ordering with respect to one another. For example, in the column vector $\vec{h}$, the first component h[0] appears earlier in time than the second component h[1], while, in the column vector $\vec{x}[n]$, the first component x[n] appears later in time than the second component x[n−1]. Note that components of the vector $\vec{x}[n]$ corresponding to negative valued time samples are assigned the value "0." For example, the first component 406, in FIG. 4D, is calculated by:

$$x_c[0] = [h[0], h[1]]^T \begin{bmatrix} x[0] \\ x[-1] \end{bmatrix} = [1, -1]^T \begin{bmatrix} 2 \\ 0 \end{bmatrix} = 2$$

where the component x[−1] is assigned the value "0," and the superscript T identifies the matrix transpose operation. The second, third, and fourth components 416, 424, and 422 are calculated as follows:

$$x_c[1] = [h[0], h[1]]^T \begin{bmatrix} x[1] \\ x[0] \end{bmatrix} = [1, -1]^T \begin{bmatrix} 1 \\ 2 \end{bmatrix} = -1,$$

$$x_c[2] = [h[0], h[1]]^T \begin{bmatrix} x[2] \\ x[1] \end{bmatrix} = [1, -1]^T \begin{bmatrix} -2 \\ 1 \end{bmatrix} = -3, \text{ and}$$

$$x_c[3] = [h[0], h[1]]^T \begin{bmatrix} x[3] \\ x[2] \end{bmatrix} = [1, -1]^T \begin{bmatrix} 0 \\ -2 \end{bmatrix} = 2$$

In general, a component of a convolved digital signal $x_c[n]$ is mathematically determined by:

$$x_c[n] = x[n] * h[n]$$
$$= \vec{h}_n \cdot \vec{x}[n]$$
$$= \sum_{i=0}^{L-1} h_n[i]x[n-i]$$

where
"*" is a symbol representing convolution, and $$\vec{x}[n] = \begin{bmatrix} x[n] \\ x[n-1] \\ \vdots \\ x[n-(L-1)] \end{bmatrix}$$

In order to compute a convolved signal component $x_c[n]$, the L previously obtain digital signal components of the digital signal x[n] are used, and the components of the vector $\vec{x}[n]$ that correspond to negative valued time samples are assigned the value "0." Convolution may also be denoted by $\vec{h}_n * x[n]$.

Figure 5:
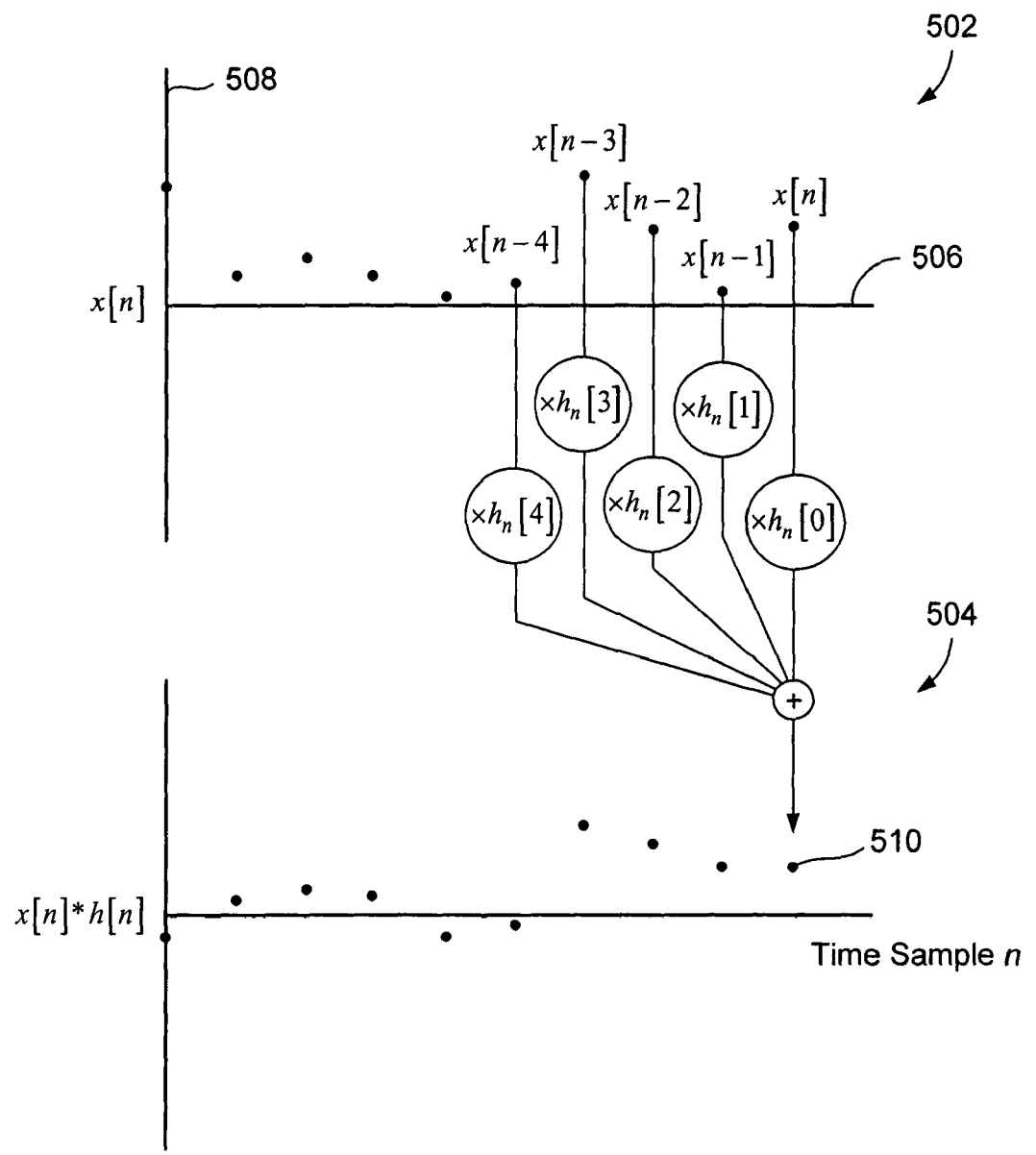
FIG. 5 illustrates convolving a digital signal with a five-component impulse response in order to obtain a convolved digital signal.

FIG. 5 illustrates convolving a digital signal displayed in a plot 502 with a five-component impulse response in order to obtain a convolved digital signal displayed in a plot 504. In plots 502 and 504, horizontal axes, such as horizontal axis 506, are time sample axes, and vertical axes, such as vertical axis 508, are digital number axes. The convolved digital signal sample 510 in the plot 504 is obtained as shown in FIG. 5 and is mathematically represented by:

$$x_c[n] = h[n] * x[n]$$
$$= \vec{h}_n * x[n]$$
$$= [h_n[0] \ h_n[1] \ h_n[2] \ h_n[3] \ h_n[4]]^T \begin{bmatrix} x[n] \\ x[n-1] \\ x[n-2] \\ x[n-3] \\ x[n-4] \end{bmatrix}$$

-continued $$= \sum_{i=0}^{4} h_n[i]x[n-i]$$

In the examples of convolution described above, the impulse response is assumed to remain constant at each time sample in the time domain. However, in practice, the impulse response of a system often depends on the conditions of the room. In other words, the impulse response of the system may change over time as conditions in the room change. For example, an impulse response of a system with no sound produced in the room is different from an impulse response of the same system at a later time when sounds are produced in the room.

EMBODIMENTS OF THE PRESENT INVENTION

Various embodiments of the present invention are directed to adaptive real-time, acoustic echo cancellation methods and systems for reducing acoustic echoes in a plurality of audio signals transmitted between a first location and a second location. An overview of acoustic echo cancellation method and system embodiments is described first followed by a description of one of many implementation embodiments of the present invention. Embodiments of the present invention are described with reference to numerous block diagrams, control-flow diagrams, mathematical equations, and graphical illustrations.

Figure 6:
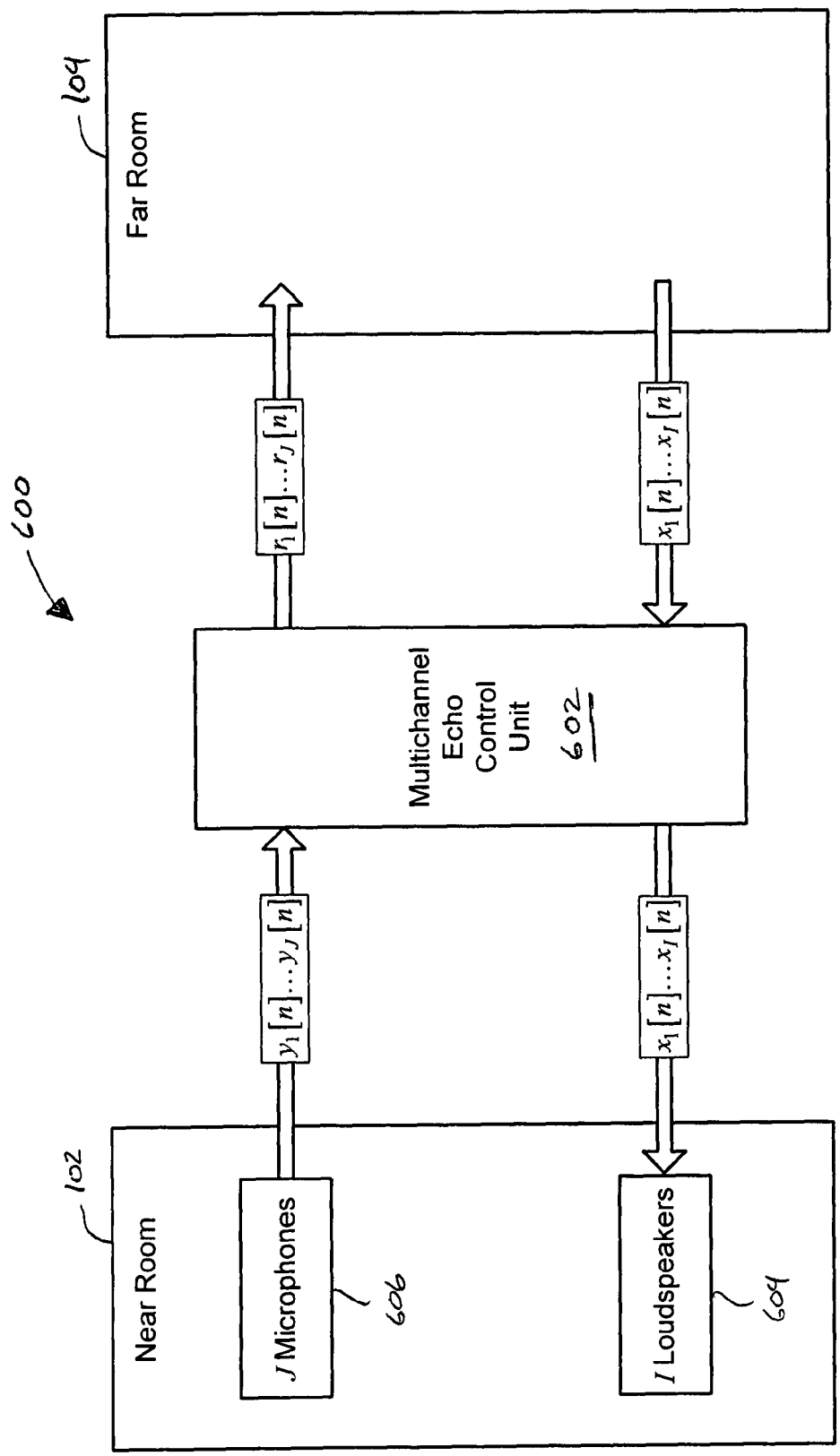
FIG. 6 shows a block diagram of a mixed multichannel audio-communication system that represents an embodiment of the present invention.

1. Overview of Acoustic Echo Cancellation in Mixed Multichannel Audio-Communication Systems FIG. 6 shows a block diagram of a mixed multichannel audio-communication system 600 that represents an embodiment of the present invention. The mixed multichannel audio-communication system 600 includes a multichannel echo control unit ("MECU") 602, and I loudspeakers 604 and J microphones 606 located in the near room 102, where I and J are natural numbers that represent the total number of loudspeakers and the total number of microphones, respectively. Digital signals $x_1[n], \ldots, x_I[n]$ generated in the far room 104 are transmitted to MECU 602 and are played simultaneously through loudspeakers 604 located in near room 102. Microphones 606 detect sounds produced by people, audio devices, and other noise generating sources located in near room 102 and detect reverberated sounds or echoes produced by sounds originating from loudspeakers 604. Acoustic coupling between loudspeakers 604 and microphones 606 is described below with reference to FIG. 7. The sounds detected by microphones 606 are transmitted in the form of J microphone-digital signals $y_1[n], \ldots, y_J[n]$ to MECU 602. MECU 602, described in greater detail below with reference to FIG. 8, processes the microphone-digital signals $y_1[n], \ldots, y_J[n]$ in order to obtain J processed digital signals $r_1[n], \ldots, r_J[n]$, which are substantially free of acoustic echoes and background noise and are transmitted to far room 104.

In the following description of the present invention, the notation, $\{\bullet\}_N$, where N is the number of elements in the set, is introduced as a compact way of representing a set of N digital signals. For example, the digital signals $x_1[n], \ldots, x_I[n]$ can instead be represented by $\{x_i[n]\}_I$.

Figure 7:
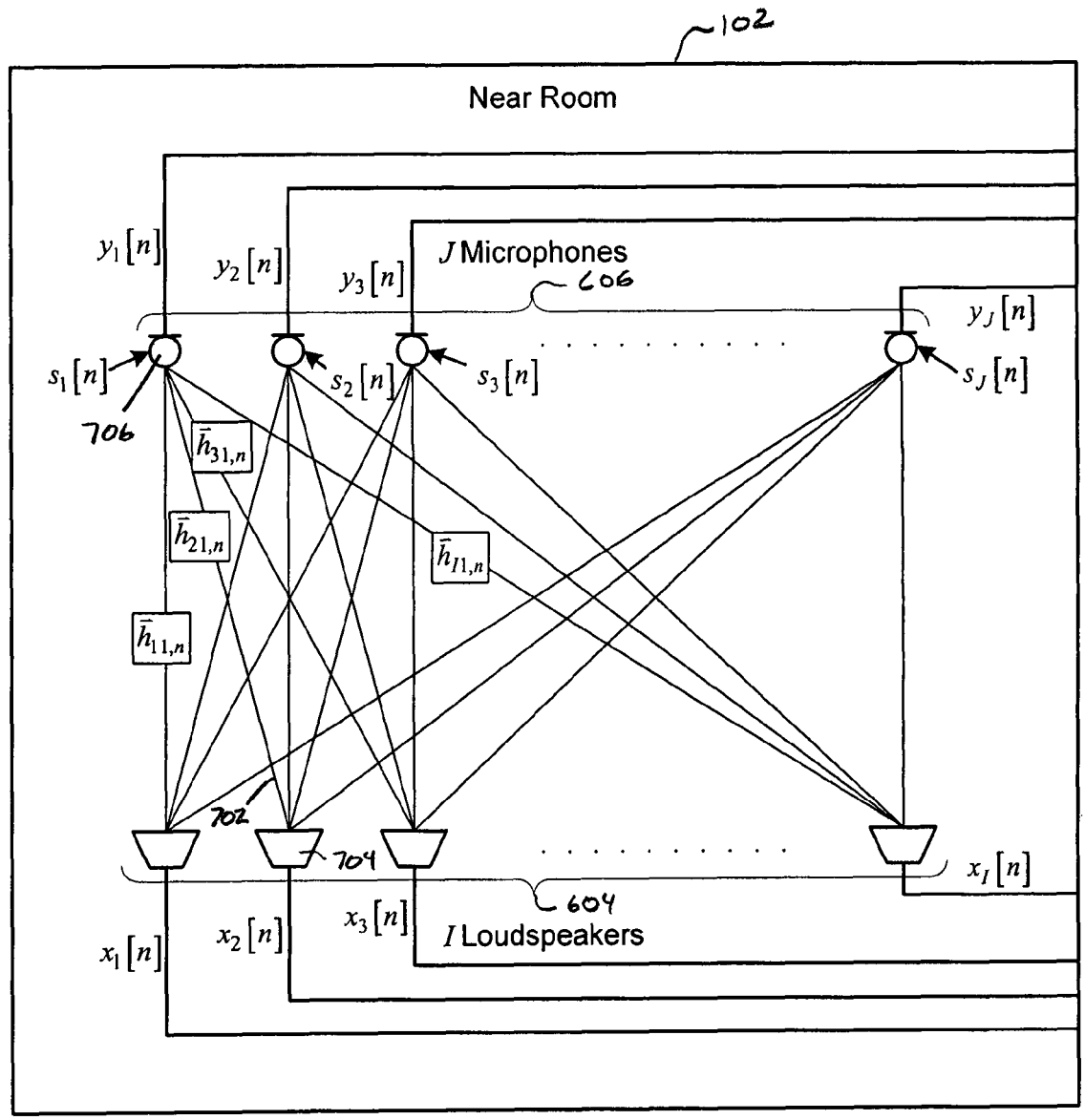
FIG. 7 shows acoustic coupling between the loudspeakers and the microphones, shown in FIG. 6, in accordance with an embodiment of the present invention.

At any given time sample n, acoustic coupling may exist between each loudspeaker and each microphone located in near room 102. This coupling is called an "echo path" and there exists a time varying, real-valued impulse-response vector $\vec{h}_{ij,n}$ for each acoustic coupling of an ith loudspeaker and a jth microphone, where $i \in \{1, \ldots, I\}$ is a loudspeaker index, and $j \in \{1, \ldots J\}$ is a microphone index. FIG. 7 shows acoustic coupling between loudspeakers 604 and microphones 606, shown in FIG. 6, that represents an embodiment of the present invention. As shown in FIG. 7, sixteen of the echo paths coupling loudspeakers and microphones are represented by lines, and four of these sixteen echo paths are labeled with a corresponding impulse-response vector $\vec{h}_{ij,n}$. For example, at the time sample n, the impulse-response vector associated with echo path 702 between the $2^{nd}$ loudspeaker 704 and the $1^{st}$ microphone 706 is $\vec{h}_{21,n}$. A reverberated version or echo of a particular digital signal $x_i[n]$ played through the ith loudspeaker and detected by the jth microphone is denoted by $\vec{h}_{ij,n} * x_i[n]$. The total echo associated with the digital signals $\{x_i[n]\}_I$ detected by the jth microphone is given by:

$$e_j[n] = \sum_{i=1}^{I} \vec{h}_{ij,n} * x_i[n]$$

As shown in FIGS. 6 and 7, microphones 606 transmit J microphone-digital signals $\{y_j[n]\}_J$ to MECU 602, where each microphone-digital signal is characterized by:

$$y_j[n] = s_j[n] + e_j[n]$$

and $s_j[n]$ represents a local source signal generated by people, audio devices, and other noise generating sources located in near room 102.

Figure 8:
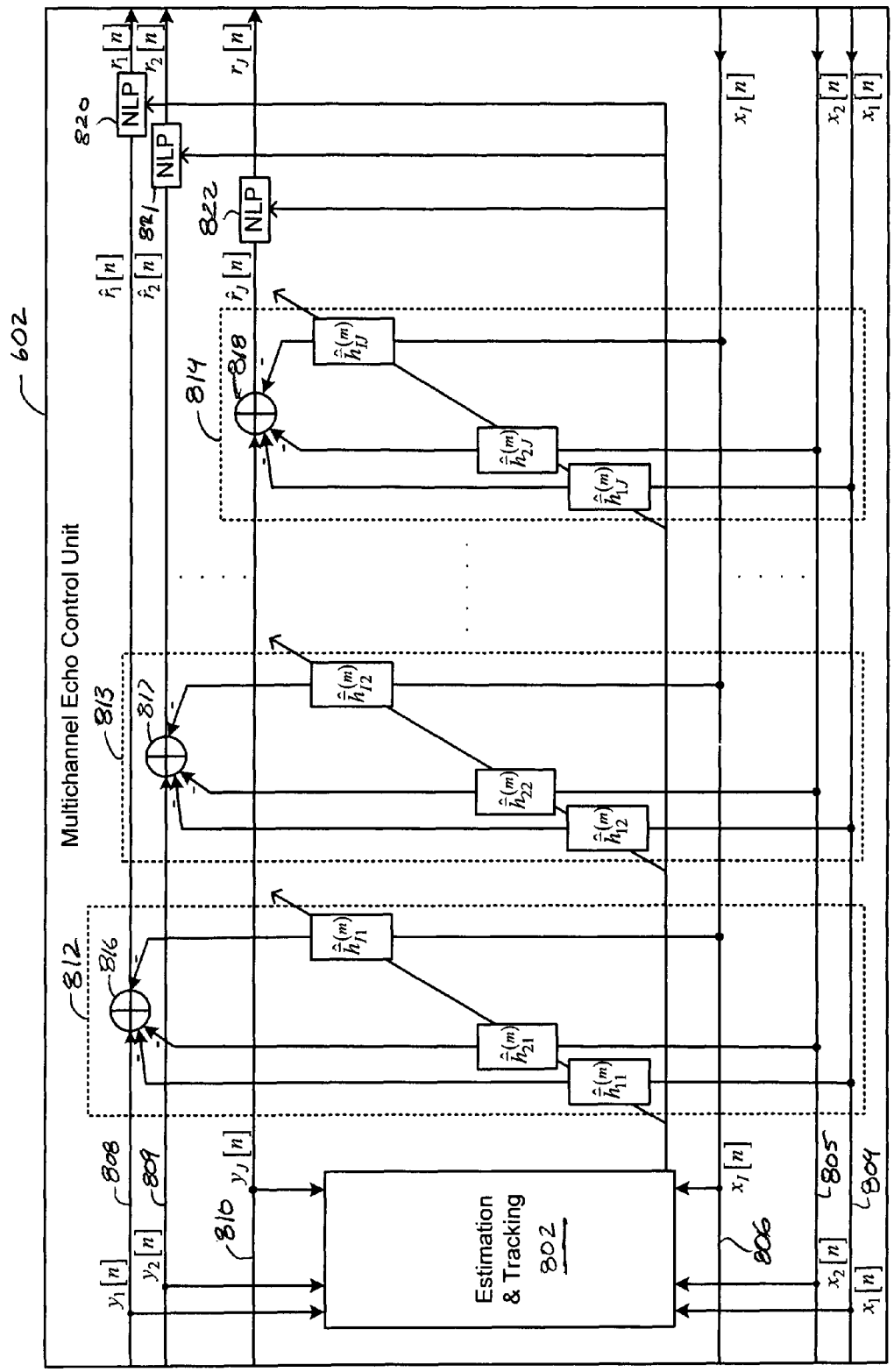
FIG. 8 shows a block diagram of acoustic echo cancellation carried out by a multichannel echo control unit in accordance with an embodiment of the present invention.

For each microphone-digital signal, method and system embodiments of the present invention are directed to substantially cancelling the acoustic echoes $\{e_j[n]\}_J$ from the corresponding microphone-digital signals $\{y_j[n]\}_J$ without causing substantial distortion to the local source signal $\{s_j[n]\}_J$. FIG. 8 shows a block diagram of acoustic echo cancellation carried out by MECU 602, shown in FIG. 6, that represents an embodiment of the present invention. MECU 602 includes an estimation and tracking block 802 that receives the digital signals $\{x_i[n]\}_I$ and the microphone-digital signals $\{y_j[n]\}_J$, as indicated by directional arrows connecting input channels 804-806 and the microphone channels 810-808 to the estimation and tracking block 802. The estimation and tracking block 802 generates approximate impulse response vectors to produce $\{\hat{e}_j[n]\}_J$, which are correspondingly subtracted from the microphone-digital signals $\{y_j[n]\}_J$ at J adaptive filters, three of which are represented by dashed-line boxes 812-814. However, rather than generating approximate-impulse-response vectors $$\{\tilde{\vec{h}}_{ij,n}\}_{IJ}$$

for each time sample n, method embodiments of the present invention are based on the assumption that the impulse-response vector $\{\vec{h}_{ij,n}\}_{IJ}$ exhibits little variation over a number of time samples, $N_c$, called the "coherence time." In other words, for each impulse-response vector, the maximum deviation over $N_c$ time samples is bounded by:

$$\|\vec{h}_{ij,n} - \vec{h}_{ij,n+N_c}\| \leq 2\sqrt{E}$$

where E represents the maximum amplification energy, or gain, produced by a microphone in response to an impulse. As a result, instead of determining a set of approximate-impulse-response vectors $$\{\hat{\vec{h}}_{ij,n}\}_{I,J}$$

for each time sample n, methods of the present invention compute a set of approximate-impulse-response vectors, denoted by $$\{\hat{\vec{h}}_{ij}^{(m)}\}_{I,J},$$

at the beginning of every $N_d$ time samples, where $N_d \ll N_c$, and m is a positive integer. An interval with $N_d$ time samples is called a "decision period," and the beginning of a decision period is called a "decision epoch."

Figure 9:
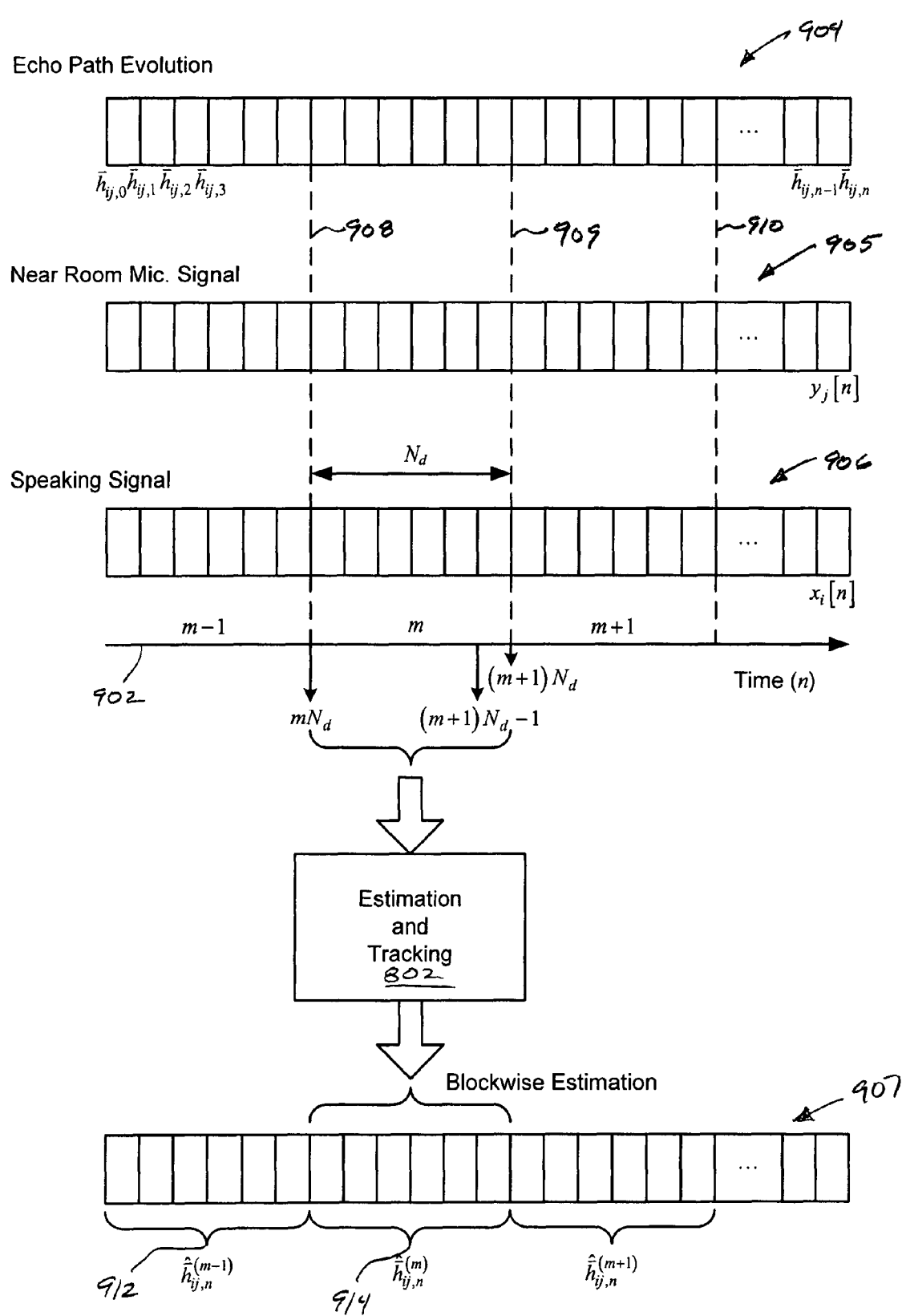
FIG. 9 shows a plot of decision periods and decision epochs associated with approximate-impulse-response vectors in accordance with an embodiment of the present invention.

FIG. 9 shows a plot of decision periods and decision epochs associated with approximate-impulse-response vectors that represent embodiments of the present invention. In FIG. 9, horizontal axis 902 represents a time axis and structures 904-907 represent digital signals and approximate impulse responses for an echo path. Each vertical line segment represents a digital signal or an impulse response associated with a time sample. In particular, the vertical line segments in the structure 904 represent n+1 consecutive impulse-response vectors $\vec{h}_{ij,0}, \ldots \vec{h}_{ij,n}$, the vertical line segments in the structure 905 represent n+1 microphone-digital signals $y_j[n]$, and the vertical line segment in the structure 906 represent n+1 digital signals $x_i[n]$. In FIG. 8, decision periods are comprised of 6 time samples, the beginning of each is identified by one of the dashed lines 908-910. In accordance with method embodiments of the present invention, estimation and tracking block 802, produces a new set of approximate-impulse-response vectors $$\{\hat{\vec{h}}_{ij}^{(m)}\}_{I,J}$$

at the beginning of each decision period. For example, suppose that during decision period 912, estimation and tracking block 802 produces an approximate-impulse-response vector $$\hat{\vec{h}}_{ij}^{(m-1)}$$

which is used to determine a reverberated digital signal $$\hat{\vec{h}}_{ij}^{(m-1)} * x_i[n]$$

for the decision period 912. At the beginning 908 of the next decision period 914, estimation and tracking block 802 produces a new approximate-impulse-response vector $$\hat{\vec{h}}_{ij}^{(m)}$$

which is then used to determine a reverberated digital signal $$\hat{\vec{h}}_{ij}^{(m)} * x_i[n]$$

for the next $N_d$ time samples of decision period 914. In general, at the beginning of a decision period $mN_d$, a set of approximate-impulse-response vectors $$\{\hat{\vec{h}}_{ij}^{(m)}\}_{I,J}$$

is computed and as the approximate-impulse-response vectors for each time sample n in the interval $[mN_d, (m+1)N_d-1]$.

Returning to FIG. 8, adaptive filters 812-814 represent the first two and last of J adaptive filters, each of which represents convolving the digital signals $\{x_i[n]\}_I$ with corresponding approximate-impulse-response vectors $$\{\hat{\vec{h}}_{ij}^{(m)}\}_{I,J}$$

generated by estimation and tracking block 802 in order to obtain approximate reverberated digital signals $$\{\hat{\vec{h}}_{ij}^{(m)} * x_i[n]\}_{I,J}.$$

For example, adaptive filter 812 represents convolving the digital signals $\{x_i[n]\}_I$ with the approximate-impulse-response vectors $\{\vec{h}_{i1}^{(m)}\}_I$, respectively, which gives approximate reverberated digital signals $$\{\hat{\vec{h}}_{i1}^{(m)} * x_i[n]\}_I.$$

In general, the jth adaptive filter represents convolving the digital signals $\{x_i[n]\}_I$ with the approximate-impulse-response vectors $\{\vec{h}_{1j}^{(m)}, \ldots, \vec{h}_{ij}^{(m)}, \ldots, \vec{h}_{Ij}^{(m)}\}$, respectively, in order to obtain approximate reverberated digital signals:

$$\{\hat{\vec{h}}_{i1}^{(m)} * x_i[n], \ldots, \hat{\vec{h}}_{ij}^{(m)} * x_i[n], \ldots, \hat{\vec{h}}_{iJ}^{(m)} * x_I[n]\}$$

Summing the reverberated digital signals associated with each of the J adaptive filters produces a set of J approximate acoustic echoes $\{\hat{e}_j[n]\}_J$, where each vector is given by:

$$\hat{e}_j[n] = \sum_{i=1}^{I} \hat{\vec{h}}_{ij}^{(m)} * x_i[n]$$

The J approximate acoustic echoes $\{\hat{e}_j[n]\}_J$ are correspondingly subtracted from each of the microphone-digital signals $\{y_j[n]\}_J$ at summing junctions, such as summing junctions 816-818, resulting in J controlled digital signals $\{\hat{r}_j[n]\}_J$, each element of which is given by:

$$\hat{r}_j[n] = s_j[n] + e_j[n] - \hat{e}_j[n]$$

$$= s_j[n] + \sum_{i=1}^{I}\left(\bar{h}_{ij,n} - \hat{\bar{h}}_{ij}^{(m)}\right) * x_i[n]$$

The difference $$\Delta e_j[n] = e_j[n] - \hat{e}_j[n]$$

is called the "residual echo." Method embodiments of the present invention carried out by estimation and tracking block 802 are directed to reducing the residual echo. Estimation and tracking block 802 also controls nonlinear processing of each of the controlled digital signals $\{\hat{r}_j[n]\}_J$. For example, nonlinear processing blocks ("NPBs") 820-822 are located in microphone channels 808-810, which represent three of the J nonlinear processes carried out by estimation and tracking block 802. The NPBs attenuate background noise and any residual echo carried by a corresponding controlled digital signal in order to produce J processed digital signals $\{r_j[n]\}_J$.

As described above with reference to FIG. 6, MECU 602 produces the J processed digital signals $\{r_j[n]\}_J$ which are transmitted to the far room 104 substantially free of acoustic echoes and background noise.

As shown in FIG. 6, MECU 602 can be located outside the near room 102. In fact, in certain embodiments of the present invention, MECU 602 can be located in an adjacent room, a room in the same building, or a room located tens or even thousands of miles away from near room 102. In other embodiments of the present invention, MECU 602 can be located inside near room 102. In other embodiments of the present invention, a second MECU can be included to cancel acoustic echoes in the digital signals $\{x_i[n]\}_I$ transmitted from the far room 104 to the near room 102.

II. Implementation

The estimation and tracking 802 may also include direct current ("DC") offset removal for signals transmitted between near room 102 and estimation and tracking 802. DC offset is a low-frequency distortion often caused by electrical interference. This electrical interference creates a constant voltage that can cause clicks and pops in the sound output from a loudspeaker. DC offset removal corrects the DC offset in each of the digital signals $\{x_i[n]\}_I$ produced in the far room 104 as follows:

$$x_i[n] = ax_i[n-1] + 0.5(1+a)(x_{i,rec}[n] - x_{i,rec}[n-1])$$

where a is a constant ranging from about 0.9 to about 0.9999, and corrects the DC offset in each of the microphone-digital signals $\{y_j[n]\}_J$ produced in the near room 102 as follows:

$$y_j[n] = ay_j[n-1] + 0.5(1+a)(y_{j,mic}[n] - y_{j,mic}[n-1])$$

Control-flow diagrams shown in FIGS. 10-16 and the following discussion provide a description of one of many method embodiments for reducing an acoustic echo in microphone-digital signals $\{y_j[n]\}_J$ and generating associated processed digital signals $\{r_j[n]\}_J$.

FIG. 10 shows a control-flow diagram that represents an embodiment of the present invention for reducing acoustic echoes in a plurality of audio signals that are transmitted from near room 102 to far room 104. In step 1001 of FIG. 10, parameters used in the equations described below are initialized. Tables 1-3 display these parameters and associated example initial values that may be used in certain applications. Note that values displayed in Tables 1-3 depend on the room setup, and therefore, are subject to change.

Table 1 displays constants that typically remain unchanged during operation of the method embodiments of the present invention. Table 1 also includes example values associated with each of the constants.

TABLE 1

| Parameter | Value |
|---|---|
| L | 6000 |
| $N_d$ | 288 |
| P | 5($N_d$) |
| N | 8192 |
| β | 0.001 |
| η | 0.001 |
| λ | 0.001 |
| $K_1$ | 0.995 |
| $K_2$ | 0.3 |
| $G_{max}$ | 1.0 |
| $G_{min}$ | 0.1 |
| M | 12 |

Note that the values associated with the parameters displayed in Table 1 can be adjusted based on different near and far room conditions and room configurations. The parameter P is the number of digital signals $y_j^{(m)}[n]$ in the digital signal vector $\vec{y}_j^{(m)}[n]$ described below with reference to step 1004 in FIG. 10. The parameter N is the number of digital signals in the frequency domain vectors $\vec{X}_i^{(m)}$, $\vec{Y}_j^{(m)}$, and $\vec{H}_{ij}^{(m)}$. The parameters β, η, λ, $K_1$, and $K_2$ are values that are used to assign relative importance or weight to terms in equations described below with reference to FIGS. 10-14. The parameters $G_{max}$ and $G_{min}$ are the maximum and minimum gain associated with each of the J microphones. The parameter M is used during double talk described below with reference to FIG. 10.

Table 2 shows initial values for variable parameters that change during iterations of the methods described below with reference to FIGS. 11-12:

TABLE 2

| Parameter | Initial Value |
|---|---|
| $\dot{\sigma}_{i,x}^{2\,(0)}$ | 0.01 |
| $\dot{\sigma}_{j,y}^{2\,(0)}$ | 0.01 |
| $\dot{\sigma}_{j,\hat{r}}^{2\,(0)}$ | 0.01 |
| $\ddot{\sigma}_{j,n}^{2\,(0)}$ | 0.01 |
| $\ddot{\sigma}_{i,x}^{2\,(0)}$ | 0.01 |
| $\ddot{\sigma}_{j,y}^{2\,(0)}$ | 0.01 |
| $M_{i,x}^{2(0)}$ | 0 |
| $M_{j,y}^{2(0)}$ | 0 |
| $G^{(0)}$ | 0 |

The parameters $\dot{\sigma}_{i,x}^{2\,(0)}$ and $\dot{\sigma}_{i,y}^{2\,(0)}$ are short-term energy variances associated with the digital signals $x_i^{(m)}[n]$ and $y_j^{(m)}[n]$, respectively. The parameter $\dot{\sigma}_{j,\hat{r}}^{2\,(0)}$ is the short-term energy variance associated with the energy in the controlled digital signal $\hat{r}_j[n]$. The parameters $\ddot{\sigma}_{i,x}^{2\,(0)}$ and $\ddot{\sigma}_{j,y}^{2\,(0)}$ are long-term energy variances associated with the digital signals $x_i^{(m)}[n]$ and $y_j^{(m)}[n]$, respectively. The parameter $\ddot{\sigma}_{j,n}^{2\,(0)}$ is a long-term energy variance associated with noise. The parameters $M_{i,x}^{2\,(0)}$ and $M_{j,y}^{2\,(0)}$ are maximum square energies associated with the digital signals $x_i^{(m)}[n]$ and $y_j^{(m)}[n]$. The parameter $G^{(0)}$ is an initial gain adaptation value described below with reference to FIG. 12.

Table 3 shows initial values for components of vectors $\vec{S}_{i,xx}^{(0)}$, $\vec{S}_{j,\vec{r}\vec{r}}^{(0)}$, $\vec{\Lambda}_{ij}^{(0)}$, $$\tilde{\vec{h}}_{ij}^{(0)}, \text{ and } \hat{\vec{h}}_{ij}^{(0)}$$

that change during iterations of the method described below with reference to FIGS. 13-14:

TABLE 3

| Vector Component | Initial Value | Component Index |
| --- | --- | --- |
| $S_{i,xx}^{(0)}[k]$ | 1.0 | k = 0, ..., N − 1 |
| $S_{j,\vec{r}\vec{r}}^{(0)}[k]$ | 1.0 | k = 0, ..., N − 1 |
| $\Lambda_{ij}^{(0)}[n']$ | 1.0 | n' = 0, ..., L − 1 |
| $\tilde{h}_{ij}^{(0)}[n']$ | 0.0 | n' = 0, ..., L − 1 |
| $\hat{h}_{ij}^{(0)}[n']$ | 0.0 | n' = 0, ..., L − 1 |

The vector $\vec{S}_{i,xx}^{(0)}$ is an initial average spectrum associated with the vector $\vec{X}_i^{(m)}$, and the vector $\vec{S}_{j,\vec{r}\vec{r}}^{(0)}$ is an initial average spectrum associated with a vector $$\tilde{\vec{R}}_j^{(m)},$$

which are described below with reference to step 1402 in FIG. 14A. The vector $\vec{\Lambda}_{ij}^{(0)}$ defines an evolving trust region described below with reference to step 1405 in FIG. 14A. The vector $$\tilde{\vec{h}}_{ij}^{(0)}$$

is an initial shadow-impulse-response vector described below with reference to step 1408 in FIG. 14A. The vector $$\hat{\vec{h}}_{ij}^{(0)}$$

is an initial approximate-impulse-response vector described below with reference to step 1409 in FIG. 14A.

In the for-loop beginning in step 1002, steps 1003-1015 are repeated for each decision epoch m. In the for-loop beginning in step 1003, steps 1004-1012 are repeated for each time sample n. In step 1004, the estimation and tracking unit 802 receives I digital signals $\{x_i^{(m)}[n]\}_I$ output from the far room 104, and J digital signals $\{y_j^{(m)[n]}\}_J$ output from the near room 102. In step 1005, a set of digital signal vectors $\{\vec{x}_i^{(m)}[n]\}_I$ is formed, where each digital signal vector is an (L+P)-component digital signal vector:

$$\vec{x}_i^{(m)}[n] = \begin{bmatrix} x_i^{(m)}[n] \\ x_i^{(m)}[n-1] \\ \vdots \\ x_i^{(m)}[n-(L+P-1)] \end{bmatrix}$$

formed from the digital signal $x_i^{(m)}[n]$ and L+P−1 previous digital signals $x_i^{(m)}[n]$, and a set of microphone-digital signal vectors $\{\vec{y}_j^{(m)[n]}\}_J$ is formed, where each microphone-digital signal vector is a P-component microphone-digital signal vector $$\vec{y}_j^{(m)}[n] = \begin{bmatrix} y_j^{(m)}[n] \\ y_j^{(m)}[n-1] \\ \vdots \\ y_j^{(m)}[n-(P-1)] \end{bmatrix}$$

formed from the microphone-digital signal $y_j^{(m)}[n]$ and P−1 previous digital signals $y_j^{(m)}[n]$. In step 1006, a fast Fourier transformation ("FFT") is applied to the each vector in the sets $$\{\vec{x}_i^{(m)}[n]\}_I, \{\vec{y}_j^{(m)}[n]\}_J \text{ and } \{\hat{\vec{h}}_{ij}^{(m-1)}\}_{IJ}$$

in order to obtain corresponding sets of domain frequency vectors $$\{\vec{X}_i^{(m)}\}_I, \{\vec{Y}_j^{(m)}\}_J \text{ and } \{\hat{\vec{H}}_{ij}^{(m-1)}\}_{IJ},$$

where vector elements are given by:

$$\vec{X}_i^{(m)} = \begin{bmatrix} X_i^{(m)}[0] \\ X_i^{(m)}[1] \\ \vdots \\ X_i^{(m)}[N-1] \end{bmatrix} = FFT\left\{\begin{bmatrix} x_i^{(m)}[n] \\ x_i^{(m)}[n-1] \\ \vdots \\ x_i^{(m)}[n-(L+P-1)] \end{bmatrix}\right\},$$

$$\vec{Y}_j^{(m)} = \begin{bmatrix} Y_j^{(m)}[0] \\ Y_j^{(m)}[1] \\ \vdots \\ Y_j^{(m)}[N-1] \end{bmatrix} = FFT\left\{\begin{bmatrix} y_j^{(m)}[n] \\ y_j^{(m)}[n-1] \\ \vdots \\ y_j^{(m)}[n-(P-1)] \end{bmatrix}\right\},$$

and $$\hat{\vec{H}}_{ij}^{(m-1)} = \begin{bmatrix} \hat{H}_{ij}^{(m-1)}[0] \\ \hat{H}_{ij}^{(m-1)}[1] \\ \vdots \\ \hat{H}_{ij}^{(m-1)}[N-1] \end{bmatrix} = FFT\left\{\begin{bmatrix} \hat{h}_{ij}^{(m-1)}[n] \\ \hat{h}_{ij}^{(m-1)}[n-1] \\ \vdots \\ \hat{h}_{ij}^{(m-1)}[n-(L-1)] \end{bmatrix}\right\}$$

An FFT and a corresponding inverse fast Fourier transform ("IFFT") are types of Fourier transformations that are often employed to avoid carrying out convolution in the time sample domain. Using the FFT and the IFFT can be hundreds or even thousands of times faster than convolving digital signals in the time sample domain. A number of different FFT and IFFT methods are described in the book "Discrete-Time Signal Processing ($2^{nd}$ Edition)," by A. Oppenhiemer, R. Schafer, and J. Buck, Prentice Hall, Inc., (1999-2000), which is just one of many references for the field of digital signal processing. Additional details can be obtained from the above-referenced book, or from many other textbooks, papers, and journal articles in this field. In step 1007, a set of controlled digital signal vectors $$\{\hat{\vec{r}}_j^{(m)}[n]\}_J$$

are computed, where each controlled digital signal vector is computed as follows:

$$\hat{\vec{r}}_j^{(m)}[n] = Tr_{N_d} \cdot IFFT\left\{\overline{Y}_j^{(m)} - \sum_{i=1}^{I} \overline{X}_i^{(m)} \circ (\hat{\overline{H}}_{ij}^{(m-1)})^*\right\}$$

where $Tr_{N_d}$ is a truncation operator of length $N_d$,

"$\circ$" represents component-wise multiplication of two vectors, $$\hat{\vec{r}}_j^{(m)}[n] = \begin{bmatrix} \hat{r}_j^{(m)}[n] \\ \hat{r}_j^{(m)}[n-1] \\ \vdots \\ \hat{r}_j^{(m)}[n-(N_d-1)] \end{bmatrix},$$

and represents the frequency domain acoustic echo in the jth microphone-digital signal.

Component-wise multiplication of the 3-tuples (1,2,3) and (3,1,2) is represented by:

$$(1,2,3) \circ (3,1,2) = (1\cdot 3, 2\cdot 1, 3\cdot 2) = (3,2,6)$$

In step 1008, the routine "determine control state" is called, which identifies four types of audio signal transmissions that can exist between the near room 102 and the far room 104. The four types of audio signal transmissions are called "control states" ("CS") and are identified as follows: (1) an audio signal is output from the near end room 102 only and is represented by $S_{NEO}$; (2) an audio signal is output from the far end room 104 only and is represented by $S_{FEO}$; (3) audio signals are simultaneously output from both the near end room 102 and the far end room 104, which is called "double-talk," is represented by $S_{DT}$; and (4) no audio signals output from the near end room 102 and the far end room 104 is represented by $S_{NS}$. In step 1009, the routine "residual echo suppression" is called in order to compute J gain-corrected processed digital signals $\{r_j^{(m)}[n]\}_J$. In step 1010, the processed digital signals $\{r_j^{(m)}[n]\}_J$ are transmitted to the far room 104. In step 1011, when n is less than or equal to (m+1) $N_d-1$, control passes to step 1012, otherwise control passes to step 1013. In step 1012, the time sample n is incremented by "1," and steps 1004-1011

$$\{\hat{\overline{h}}_{ij,n}\}_{IJ}$$

are repeated. In other words, the approximate-impulse-response vectors are not updated during the $N_d$ decision period. In step 1013, when another decision epoch m is available, control passes to step 1014, otherwise the routine "determine $\{r_j[n]\}_J$" is terminated. In step 1014, the decision epoch m is incremented by "1." In step 1015, the routine "determine"

$$\{\hat{\overline{h}}_{ij,n}\}_{IJ}"$$

is called. In other words, a new decision period with $N_d$ decision epochs is initiated and the approximate impulse response vectors are updated.

Figure 11A:
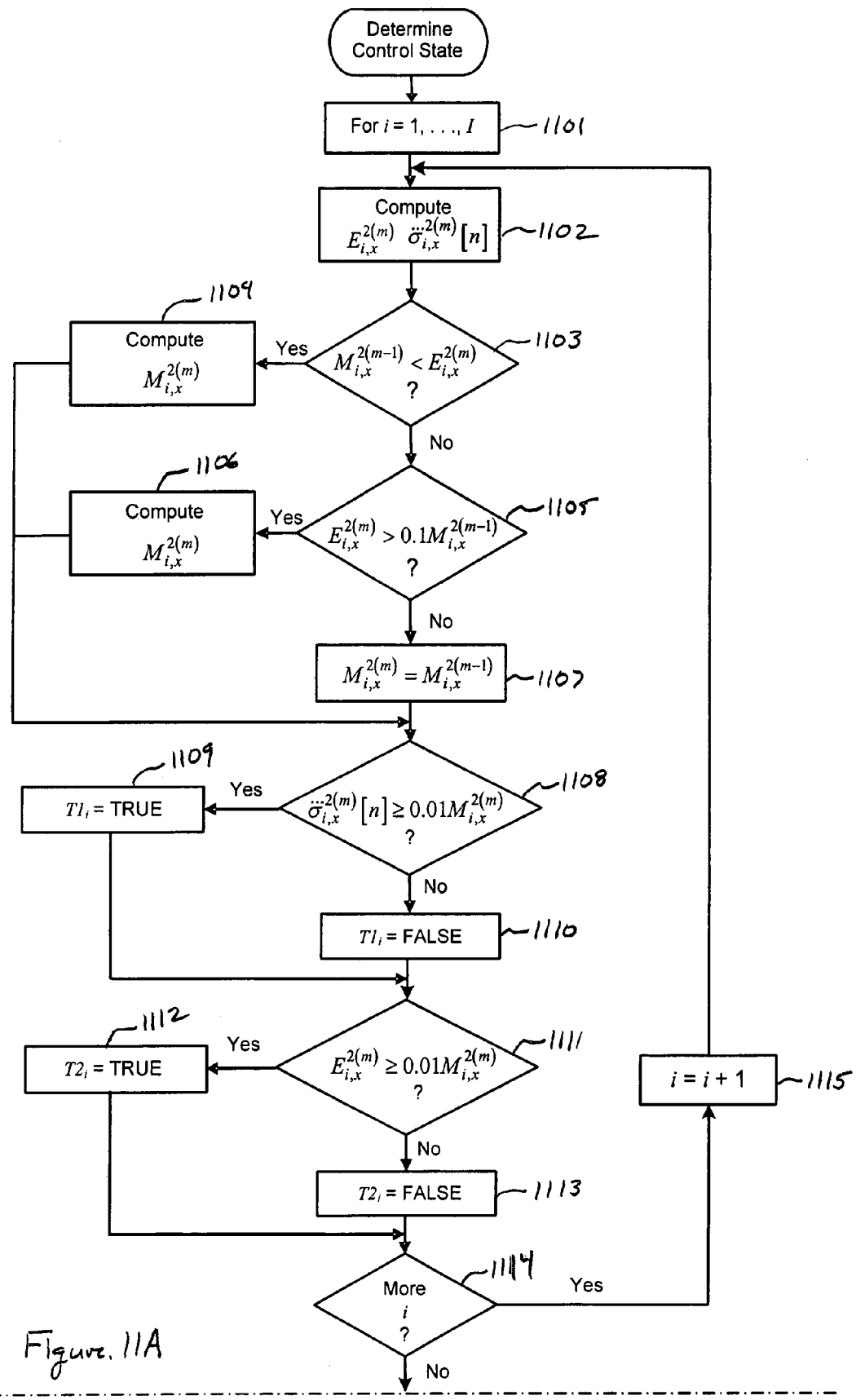
FIGS. 11A-11C show a control-flow diagram for the routine "determine control state" called in step 1008 in FIG. 10 and represents an embodiment of the present invention.
Figure 11B:
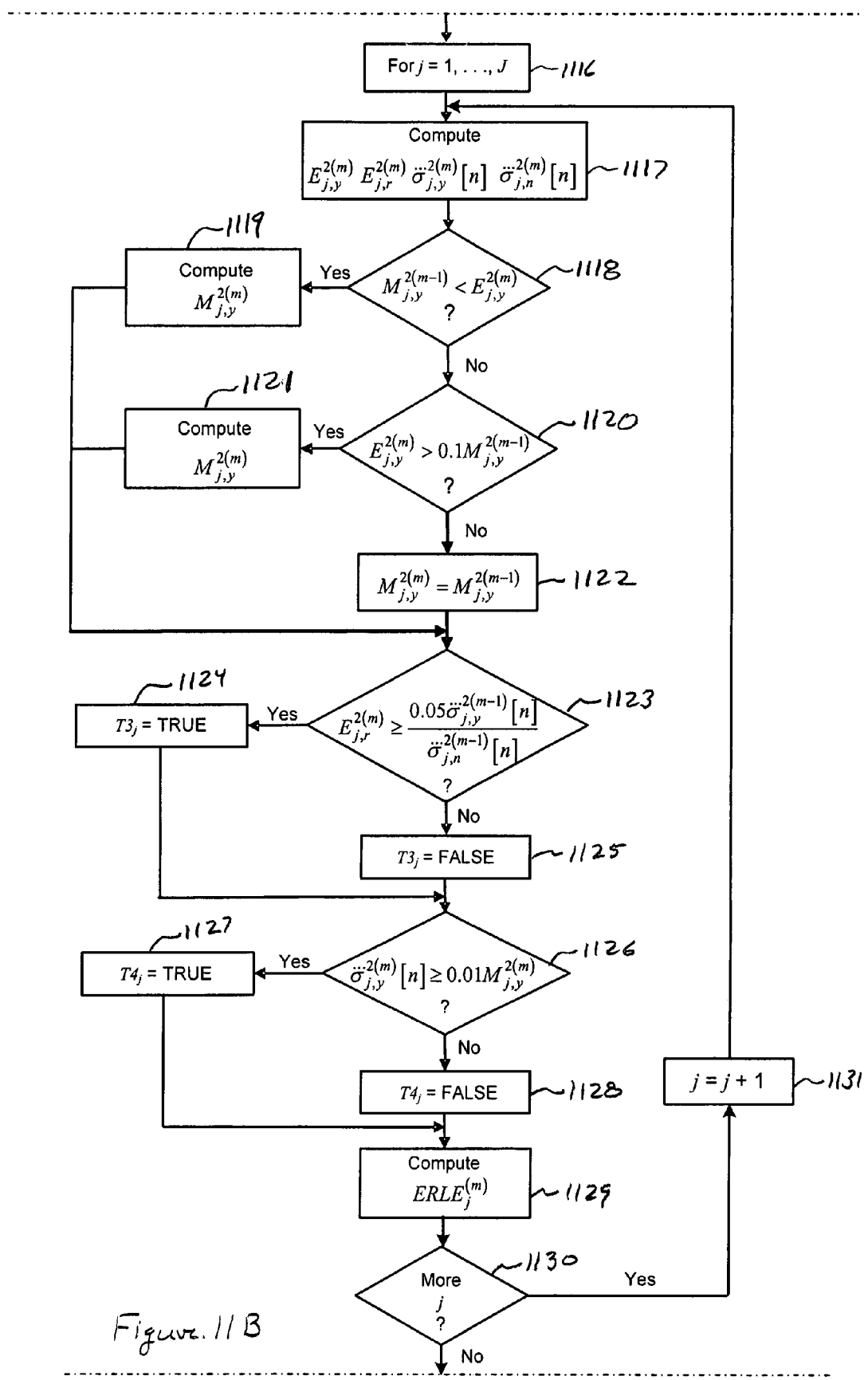
Figure 11C:
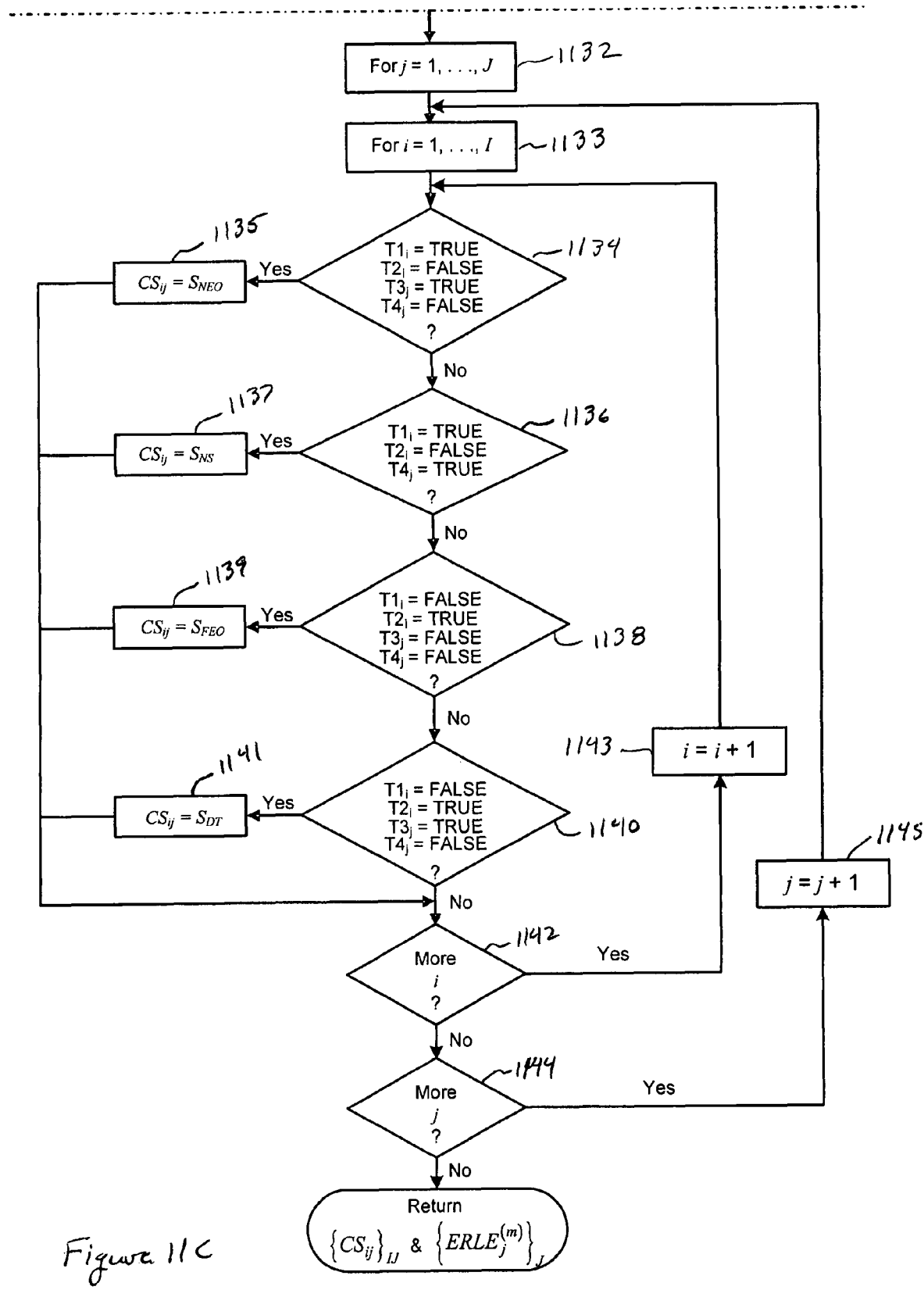

FIGS. 11A-11C show a control-flow diagram for the routine "determine control state" called in step 1008 in FIG. 10 and represents an embodiment of the present invention. In the for-loop beginning in step 1101 of FIG. 11A, steps 1102-1114 are repeated for each index $i \in \{1, \ldots, I\}$. In step 1102, an average square energy associated with the vector $\vec{x}_i^{(m)}[n]$ is computed as follows:

$$E_{i,x}^{2\ (m)} = \|\vec{x}_i^{(m)}[n]\|^2,$$

and a long-term energy variances is recursively determined for the average square energies by:

$$\vec{\sigma}_i^2[n] = 0.99 \vec{\sigma}_i^2[n] + 0.001 E_{i,x}^{2\ (m)}$$

In steps 1103-1107, a maximum square energy $M_{i,x}^{2\ (m)}$ associated with the digital signal vector $\vec{x}_i^{(m)}[n]$ is determined. In step 1103, when the maximum square energy $M_{i,x}^{2\ (m-1)}$ is less than the average square energy $E_{i,x}^{2\ (m)}$ control passes to step 1104, otherwise control passes to step 1105. In step 1104, the maximum square energy is computed by:

$$M_{i,x}^{2\ (m)} = \min\{E_{i,x}^{2\ (m)}, 10 M_{i,x}^{2\ (m-1)}\}$$

and control passes to step 1108. In step 1105, when the average square energy $E_{i,x}^{2\ (m)}$ is greater than $0.1 M_{i,x}^{2\ (m-1)}$ control passes to step 1106, otherwise control passes to step 1107. In step 1106, the maximum square energy is computed by:

$$M_{i,x}^{2\ (m)} = 0.999 M_{i,x}^{2\ (m-1)} + 0.001 E_{i,x}^{2\ (m)}$$

and control passes to step 1108. In step 1107, the maximum square energy $M_{i,x}^{2\ (m)}$ is assigned the value of $M_{i,x}^{2\ (m-1)}$ from the previous decision period. In steps 1108-1113, Boolean logic values "TRUE" and "FALSE" are assigned to Boolean variables $T1_i$, $T2_i$. In step 1108, when the long-term variance $\vec{\sigma}_i^2[n]$ is greater than or equal to $0.01 M_{i,x}^{2\ (m)}$, control passes to step 1109 and $T1_i$ is set to "TRUE," otherwise control passes to step 1110 and $T1_i$ is set to "FALSE." In step 1111, when the average square energy $E_{i,x}^{2\ (m)}$ is greater than or equal to $0.01 M_{i,x}^{2\ (m)}$, control passes to step 1112 and $T2_i$ is set to "TRUE," otherwise control passes to step 1114 and $T2_i$ is set to "FALSE." In step 1114, when i is greater than I control passes to step 1116, in FIG. 11B, otherwise control passes to step 1115. In step 1115, i is incremented by "1" and steps 1102-1114 are repeated.

In the for-loop beginning in step 1116 of FIG. 11B, steps 1117-1131 are repeated for each index $j \in \{1, \ldots, J\}$. In step 1116, average energies are computed for $\vec{y}_j^{(m)}[n]$, $$\hat{\vec{r}}_j^{(m)}[n],$$

and a shadow-error vector $$\tilde{\vec{r}}_j^{(m)}[n]$$

as follows:

$$E_{j,y}^{2(m)} = \|\vec{y}_j^{(m)}[n]\|^2,$$

$$E_{j,\hat{r}}^{2(m)} = \left\|\hat{\vec{r}}_j^{(m)}[n]\right\|^2,$$

and $$E_{j,\tilde{r}}^{2(m)} = \left\|\tilde{\vec{r}}_j^{(m)}[n]\right\|^2$$

and long-term energy variances are recursively determined for the average square energies by:

$$\ddot{\sigma}_i^2[n] = 0.99\ddot{\sigma}_i^2[n] + 0.01 E_{j,y}^{2\;(m)}, \text{ and}$$

$$\ddot{\sigma}_i^2[n] = 0.99\ddot{\sigma}_i^2[n] + 0.01 E_{j,\tilde{r}}^{2\;(m)}$$

In steps 1118-1122, a maximum square energy $M_{i,y}^{2\;(m)}$ associated with the digital signal vector $\vec{y}_i^{(m)}[n]$ is determined. In step 1118, when the maximum square energy $M_{i,y}^{2\;(m-1)}$ is less than the average square energy $E_{i,y}^{2\;(m)}$ control passes to step 1119, otherwise control passes to step 1120. In step 1119, the maximum square energy is computed by:

$$M_{i,y}^{2\;(m)} = \min\{E_{i,y}^{2\;(m)}, 10 M_{i,y}^{2\;(m-1)}\}$$

and control passes to step 1123. In step 1120, when the average square energy $E_{i,y}^{2\;(m)}$ is greater than $0.1 M_{i,y}^{2\;(m-1)}$ control passes to step 1121, otherwise control passes to step 1121. In step 1121, the maximum square energy is computed by:

$$M_{i,y}^{2\;(m)} = 0.999\; M_{i,y}^{2\;(m-1)} + 0.001 E_{i,y}^{2\;(m)}$$

and control passes to step 1123. In steps 1123-1128, Boolean logic values "TRUE" and "FALSE" are assigned to Boolean variables $T3_j$, $T4_j$. In step 1123, when the average square energy $E_{j,\hat{r}}^{2\;(m)}$ is greater than or equal to $0.05\ddot{\sigma}_i^2[n]/\ddot{\sigma}_i^2[n]$, control passes to step 1124 and $T3_j$ is set to "TRUE," otherwise control passes to step 1125 and $T3_j$ is set to "FALSE." In step 1126, when the long-term variance $\ddot{\sigma}_i^2[n]$ is greater than or equal to $0.001 M_{j,y}^{2\;(m)}$ control passes to step 1127 and $T4_j$ is set to "TRUE," otherwise control passes to step 1128 and $T4_j$ is set to "FALSE." In step 1129, an echo return loss enhancement value ("ERLE") is calculated according to:

$$ERLE_j^{(m)} = 10\log_{10}\left(\frac{\dot{\sigma}_{j,y}^{2(m)}[n]}{\dot{\sigma}_{j,\hat{r}}^{2(m)}[n]}\right)$$

where $$\dot{\sigma}_{j,y}^{2(m)}[n] = 0.8\dot{\sigma}_{j,y}^{2(m-1)}[n] + 0.2 E_{j,y}^{2(m)}, \text{ and}$$

$$\dot{\sigma}_{j,\hat{r}}^{2(m)}[n] = 0.8\dot{\sigma}_{j,\hat{r}}^{2(m-1)}[n] + 0.2 E_{j,\hat{r}}^{2(m)}$$

are short-term variances associated with the average square energies $E_{i,x}^{2\;(m)}$ and $E_{j,\hat{r}}^{2\;(m)}$, respectively. The ERLE can be used to gauge the performance of acoustic echo cancellation when the system is in the state $S_{FEO}$ and determine approximate-impulse-response vectors when the system is in double talk described below in step 1309 of FIG. 13A. In step 1130, when j is greater than J control passes to step 1132, in FIG. 11C, otherwise control passes to step 1131. In step 1131, j is incremented by "1" and steps 1117-1130 are repeated.

In the for-loop beginning in step 1132 of FIG. 11C, steps 1133-1145 are repeated for each $j\in\{1,\ldots J\}$. In the for-loop beginning in step 1133, steps 1134-1143 are repeated for each $i\in\{1,\ldots,I\}$. In steps 1134-1141, the Boolean logic values determined in steps 1108-1113 in FIG. 11A and steps 1123-1128 in FIG. 11B are used to determine a control state $CS_{ij}$ for each echo path. In step 1134, when $T1_i$ and $T3_j$ are "TRUE," and $T2_i$ and $T4_j$ are "FALSE," control passes to step 1135 and $CS_{ij}$ is assigned $S_{NEO}$, otherwise control passes to step 1136. In step 1136, when $T1_i$ and $T4_j$ are "TRUE," and $T2_i$ is "FALSE," control passes to step 1137, and $CS_{ij}$ is assigned $S_{NS}$, otherwise control passes to step 1138. In step 1138, when $T2_i$ is "TRUE" and $T1_i$, $T3_j$, and $T4_j$ are "FALSE," control passes to step 1139, and $CS_{ij}$ is assigned $S_{FEO}$, otherwise control passes to step 1140. In step 1140, when $T2_i$ and $T3_j$ are "TRUE," and $T1_i$ and $T4_j$ are "FALSE," control passes to step 1141, and $CS_{ij}$ is assigned $S_{DT}$, otherwise control passes to step 1142. In step 1142, when i is greater than I control passes to step 1144, otherwise control passes to step 1143. In step 1143, i is incremented by "1" and steps 1134-1142 are repeated. In step 1144, when j is greater than J, $\{CS_{ij}\}_{I,J}$ and $\{ERLE_j^{(m)}\}_J$ are returned, otherwise, in step 1145, j is incremented by "1" and steps 1133-1144 are repeated.

Figure 12:
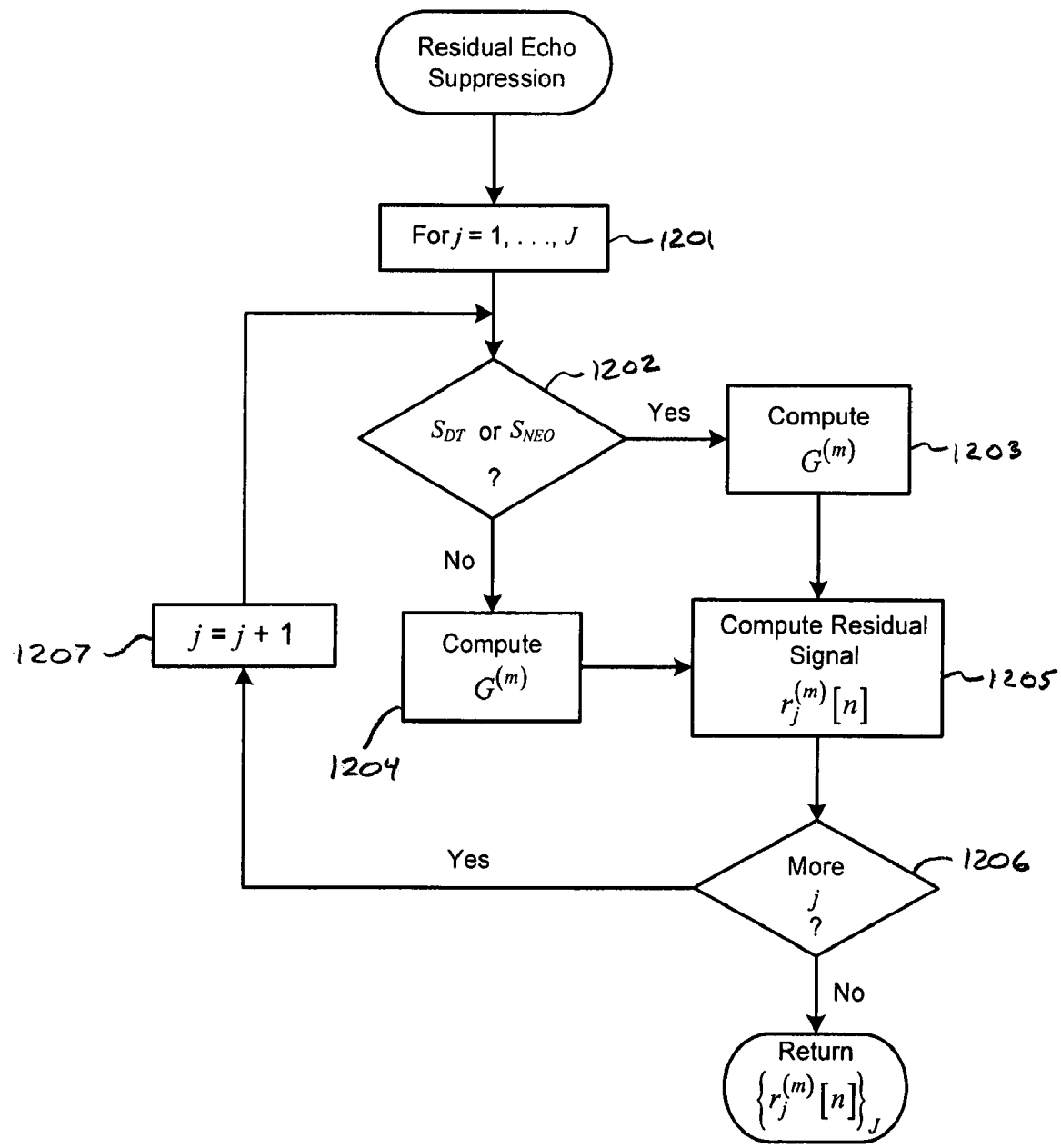
FIG. 12 is a control-flow diagram for the routine "residual echo suppression" called in step 1009 in FIG. 10 and represents an embodiment of the present invention.

FIG. 12 is a control-flow diagram for the routine "residual echo suppression" called in step 1009 in FIG. 10 and represents an embodiment of the present invention. In the for-loop beginning in step 1201, steps 1202-1207 are repeated for each index j. The control states of the audio transmission are used to correct for gain in each of the processed digital signals $\{r_j^{(m)}[n]\}_J$. For example, during double-talk, or when an audio signal is produced in the near room 102 only, the gain acquired by the controlled digital signals $\{\hat{r}_j^{(m)}[n]\}_J$ is larger than when an audio signal is produced only in the far room 104 or when there is no audio signal transmitted at all. The maximum and minimum amounts of gain that the controlled digital signal can acquire are represented by the constants $G_{max}$ and $G_{min}$, respectively. Steps 1202-1205 adjust the gain in each of the processed digital signals $\{r_j^{(m)}[n]\}_J$. In step 1202, when there is double talk or sound produced in the near room 102 only, control passes to step 1203, otherwise control passes to step 1204. In step 1203, the gain is computed as follows:

$$G^{(m)} = K_2 G^{(m-1)} + (1-K_2) G_{max}$$

where $K_2$ is a weight assigning a lower relative importance to $G^{(m-1)}$ than to the maximum gain $G_{max}$. In step 1204, the gain is computed as follows:

$$G^{(m)} = K_1 G^{(m-1)} + (1-K_1) G_{min}$$

where $K_1$ is a weight assigning a relatively higher importance to $G^{(m-1)}$ than to the minimum gain $G_{min}$. In step 1205, the jth processed digital signal is determined by:

$$r_j^{(m)}[n] = G^{(m)} \hat{r}_j^{(m)}[n]$$

In step 1206, when j is less than or equal to J, control passes to step 1207 and j is incremented by "1," otherwise processed digital signals $\{r_j^{(m)}[n]\}_J$ are returned.

FIG. 13A is a control-flow diagram for the routine "determine $$\{\hat{\bar{h}}_{ij}^{(m)}\}_{IJ}$$"

called in step 1015 in FIG. 10 and represents an embodiment of the present invention. In the for-loop beginning in step 1302, steps 1302-1313 are repeated for each i∈{1, ..., }. In the for-loop beginning in step 1302, steps 1303-1311 are repeated for each j∈{1, ... J}. In step 1303, when the $CS_{ij}$ is $S_{FEO}$, control passes to step 1304, otherwise control passes to step 1305. In step 1304, the routine "compute $$\hat{\bar{h}}_{ij}^{(m)}$$"

is called and an approximate-impulse-response vector $$\hat{\bar{h}}_{ij}^{(m)}$$

is computed. In step 1305, when the $CS_{ij}$ is $S_{NEO}$ or $S_{NS}$, control passes to step 1306, otherwise control passes to step 1307. In step 1306, the impulse-response vector is updated by assigning elements in the vector $$\hat{\bar{h}}_{ij}^{(m)}$$

to corresponding values in previous impulse response $$\hat{\bar{h}}_{ij}^{(m-1)},$$

and the shadow-impulse-response vector is updated by assigning elements in the shadow-impulse-response vector $$\hat{\bar{h}}_{ij}^{(m)}$$

to corresponding elements in the shadow-impulse-response vector $$\hat{\bar{h}}_{ij}^{(m-1)}$$

from the previous decision period. Steps 1307, 1308, and 1309 are used to guard against misinterpreting the presence of double talk as described below with reference to FIGS. 13B-13C. In step 1307, when "count" does not equal "0," control passes to step 1307, otherwise control passes to step 1309. In step 1308, the "count" is decremented by "1" and control passes to step 1306. In step 1309, the approximate-impulse-response vector $$\hat{\bar{h}}_{ij}^{(m)}$$

for double talk is selected form an impulse-response data structure represented by a set $$\{\hat{\bar{h}}_{ij}^{(m_1)}, \ldots, \hat{\bar{h}}_{ij}^{(m_K)}\}.$$

In step 1310, the "count" is assigned the value M. The value M can be 10, 12, 15, 18, or any other suitable value. In step 1310, when j is greater than J, control passes to step 1312, otherwise control passes to step 1311. In step 1311, i is incremented by "1" and steps 1302-1310 are repeated. In step 1312, when i is greater than I, the set of approximate impulse response vectors $$\{\hat{\bar{h}}_{ij}^{(m)}\}_{IJ}$$

is returned, otherwise control passes to step 1313 and j is incremented by "1."

Note that there are I×J impulse-response data structures, one impulse-response data structure for each different echo path. Each data structure includes the K most recent approximate impulse responses with the highest signal to noise ratio. The subscripts on the decision epochs m correspond to the order in which the impulse response vectors have been added to the data structure. For example, in the data structure in step 1309, the impulse response vector $$\hat{\bar{h}}_{ij}^{(m_K)}$$

has been in the data structure the longest, and the impulse response vector $$\hat{\bar{h}}_{ij}^{(m_1)}$$

is the most recent addition to the data structure. Note that the approximate-impulse-response vector is not updated during double talk because during double talk the signal-to-noise ratio decreases rapidly. The increased noise distorts the approximate-impulse-response vector. In order to avoid this distortion, the approximate-impulse-response vector $$\hat{\bar{h}}_{ij}^{(m)}$$

is selected from the corresponding impulse-response data structure. In various embodiments of the present invention, the approximate-impulse-response vector can be selected based on any number of different criteria. For example, in one embodiment of the present invention, an approximate-impulse-response vector can be selected in step 1309 according to which impulse-response vector has the largest corresponding $ERLE_j^{(m_i)}$. In another embodiment of the present invention, in step 1309, the approximate-impulse-response vector can be selected from the corresponding data structure based on which approximate-impulse-response vector has been in the data structure the longest, which is $$\hat{\tilde{h}}_{ij}^{(m_K)}.$$

In the control-flow diagram of FIG. 13A, the steps 1307, 1308, and 1306 are repeated for M iterations in order avoid misinterpreting noises transmitted in a corresponding echo paths as $S_{DT}$. FIGS. 13B-13C shows two plots of amplification energy versus time for the four types of control states that represents an embodiment of the present invention. In FIGS. 13B-13C, vertical axes, such as vertical axis 1314, represent amplification energy associated with signals transmitted between the near room 102 and the far room 104, horizontal axes, such as horizontal axis 1315, represent time, and horizontal dashed lines, such as dashed line 1316, correspond to a double talk threshold energy, $E_{th}$. Curves 1318 and 1320 represent the amplification energies associated with signals transmitted between the near room 102 and the far room 104. Amplification energies below the double talk threshold $E_{th}$ correspond to an $S_{FEO}$, $S_{NEO}$, or $S_{NS}$ control state. Peak 1322 corresponds to amplification energy resulting from double talk, which exceeds the double talk threshold $E_{th}$. However, peak 1324 corresponds to an echo path noise produced in the near room 102 or the far room 104. This noise initially creates the appearance of double talk because the amplification energy exceeds the double talk threshold energy $E_{th}$ even though double talk is not actually taking place. In order to avoid misinterpreting short duration noises as double talk, at time 1326, a countdown begins with the variable "count," described with reference to steps 1306, 1307, and 1305, which avoids selecting an approximate-impulse-response vector from the data structure $$\{\hat{\tilde{h}}_{ij}^{(m_1)}, \ldots, \hat{\tilde{h}}_{ij}^{(m_K)}\}$$

in step 1308 until double talk has been confirmed for M iterations. In other words, the method of the present invention continues operating as if double talk has not occurred for M decision periods. If after M iterations the amplification energy has decreased, as indicated at time 1328 in FIG. 13B, inappropriate selection of an approximate-impulse-response vector for double talk has been avoided. On the other hand, if after M iterations the amplification energy has increased, as indicated the curve 1320 at time 1330 in FIG. 13C, an approximate impulse-response for double talk is selected in step 1309.

The methods now described with reference to FIGS. 14-17 are repeated for each echo path. FIG. 14A is a control-flow diagram for the routine "compute $$\hat{\tilde{h}}_{ij}^{(m)}"$$

called in step 1304 in FIG. 14 and represents an embodiment of the present invention. In step 1401, the FFT is applied to the shadow impulse-response vector $$\hat{\tilde{h}}_{ij}^{(m-1)}$$

in order to obtain a frequency domain dependent vector:

$$\vec{\tilde{H}}_{ij}^{(m-1)} = \begin{bmatrix} \tilde{H}_{ij}^{(m-1)}[0] \\ \tilde{H}_{ij}^{(m-1)}[1] \\ \vdots \\ \tilde{H}_{ij}^{(m-1)}[N-1] \end{bmatrix} = FFT \left\{ \begin{bmatrix} \hat{\tilde{h}}_{ij}^{(m-1)}[n] \\ \hat{\tilde{h}}_{ij}^{(m-1)}[n-1] \\ \vdots \\ \hat{\tilde{h}}_{ij}^{(m-1)}[n-(L-1)] \end{bmatrix} \right\}$$

In step 1402, a frequency domain, shadow-error vector is computed as follows:

$$\vec{\tilde{R}}_j^{(m)} = FFT \cdot Tr_P \cdot IFFT \left\{ \vec{Y}_j^{(m)} - \sum_{i=1}^{I} \left( \vec{X}_i^{(m)} \circ (\vec{\tilde{H}}_{ij}^{(m-1)})^* \right) \right\}$$

where
$Tr_P$ is a truncation operator of length P, and $$\vec{\tilde{R}}_j^{(m)} = \begin{bmatrix} \tilde{R}_j^{(m)}[0] \\ \tilde{R}_j^{(m)}[1] \\ \vdots \\ \tilde{R}_j^{(m)}[N-1] \end{bmatrix}$$

In step 1403, an IFFT is applied to the frequency domain, shadow-error vector in order to obtain a shadow-error vector:

$$\vec{\tilde{r}}_j^{(m)} = FFT\{\vec{\tilde{R}}_j^{(m)}\}$$

In step 1404, the routine "determine $$\vec{\tilde{\varepsilon}}_{ij}^{(m)}"$$

is called to calculate a shadow mismatch vector $$\vec{\tilde{\varepsilon}}_{ij}^{(m)}.$$

In step 1405, an evolving trust-region vector is determined in accordance with the following recursive formula:

$$\vec{\Lambda}_{ij}^{(m)} = (1-\eta)\vec{\Lambda}_{ij}^{(m-1)} + \eta \hat{\tilde{h}}_{ij}^{(m-1)} \circ \hat{\tilde{h}}_{ij}^{(m-1)}$$

The parameter $\eta$ is a weighting factor. The trust-region vector $\vec{\Lambda}_{ij}^{(m)}$ is used to compute the shadow update step size $\mu_{ij,m}$ in the routine "determine $\mu_{ij,m}$," called in step 1406. The trust-region vector $\vec{\Lambda}_{ij}^{(m)}$ is also used to compute and the adaptation step size $\gamma_{ij,m}$ in the routine "determine $\gamma_{ij,m}$" called in step 1407. In step 1408, the shadow mismatch vector $$\tilde{\varepsilon}_{ij}^{(m)},$$

determined in n step 1404, and the shadow update step size $\mu_{ij,m}$, determined in step 1406, are used to recursively compute a shadow-impulse-response vector:

$$\tilde{h}_{ij}^{(m)} = \tilde{h}_{ij}^{(m-1)} + \mu_{ij,m}\tilde{\varepsilon}_{ij}^{(m)}$$

In step 1409, the adaptation step size $\gamma_{ij,m}$, determined in step 1407, is used to recursively compute the approximate-impulse-response vector as follows:

$$\hat{h}_{ij}^{(m)} = (1 - \gamma_{ij,m})\hat{h}_{ij}^{(m-1)} + \gamma_{ij,m}\tilde{h}_{ij}^{(m)}$$

The parameter $\gamma_{ij,m}$ is used to weighting factor. In step 1410, when the $ERLE_j^{(m)}$ is greater than a threshold value C, control passes to step 1411. The threshold value C can be 10, 12, 15, or any other suitable value for weighting the approximate-impulse-response vector $$\hat{h}_{ij}^{(m)}.$$

In step 1411, the impulse-response data structure described above with reference to step 1309, in FIG. 13A:

$$\{\hat{h}_{ij}^{(m_1)}, \hat{h}_{ij}^{(m_2)}, \ldots, \hat{h}_{ij}^{(m_{K-1})}, \hat{h}_{ij}^{(m_K)}\}$$

is updated.

The impulse-response vectors are arranged in the impulse-response data structure in order of increasing decision epoch values as follows $m_1 > m_2 > \ldots > m_{K-1} > m_K$, where the decision epoch $m_K$ corresponds to an approximate-impulse-response vector that has been in the data structure for the longest period of time, and the decision epoch $m_1$ corresponds to the most recent approximate-impulse-response vector added to the data structure. In one embodiment of the present invention, the data structure can be updated in step 1411 by removing the impulse-response vector $\vec{h}_{ij}^{(m_K)}$ from the data structure and adding the most recently computed impulse-response vector $$\hat{h}_{ij}^{(m)}$$

to the data structure computed in step 1409, which gives the impulse response data structure:

$$\{\hat{h}_{ij}^{(m)}, \hat{h}_{ij}^{(m_1)}, \ldots, \hat{h}_{ij}^{(m_{K-2})}, \hat{h}_{ij}^{(m_{K-1})}\}$$

In other embodiments of the present invention, the data structure can be updated in step 1411 according to the magnitude of the ERLE values associated with each approximate-impulse-response vector. For example, the approximate-impulse-response vector with the smallest associated ERLE value is removed from the data structure in order to accommodate addition of the most recently computed approximate-impulse-response vector computed in step 1409 and have an ERLE satisfying the threshold condition in steps 1410.

The shadow update step size $\mu_{ij,m}$ determined by the routine "determine $\mu_{ij,m}$" called in the step 1406 substantially ensures that the shadow-impulse-response vector $$\tilde{h}_{ij}^{(m)}$$

determined in the step 1408 lies within an evolving "trust region" that lies within an L-dimensional search space U. For every shadow-impulse-response vector $$\tilde{h}_{ij}^{(m)}$$

there is a separate trust region that lies within the search space U. The trust region can be have many different hyper-dimensional shapes, such as a hyper-spherical region, a hyper-elliptical region, a hyper-cubic region, or any other hyper-dimension region that lies within the search space U.

In one embodiment of the present invention described with reference to FIG. 14B, the trust region is assumed to be a hyper-elliptical region that lies within the search space U. FIG. 14B provides a two-dimensional illustration of a hyper-elliptical region 1420 located within the search space U 1422 that represents an embodiment of the present invention. Although in FIG. 14B the regions 1420 and 1422 are represented in two-dimensions, in practice these regions are actually L-dimensional vector subspaces of $\Box^L$ and are centered at the origin of $\Box^L$. The shape of the hyper-elliptical region 1420 is determined by the trust-region vector $\vec{\Lambda}_{ij}^{(m-1)}$ computed in step 1405, which in this example is a hyper-elliptical vector defining shape of the hyper-elliptical region 1420. In other words, as shown in FIG. 14B, six previously determined shadow-impulse-response vectors represented by dots lie within the hyper-elliptical region 1420 which is associated with the vector $\vec{\Lambda}_{ij}^{(m-1)}$. The hyper-elliptical region 1420 is referred to as an "evolving" hyper-elliptical region because when a subsequent hyper-ellipsoid-specification vector $\vec{\Lambda}_{ij}^{(m)}$ is determined, the associated region changes orientation within the search space U 1422 but this newly oriented elliptical region retains a substantially elliptical shape. A newly computed shadow-impulse-response vector $\tilde{h}_{ij}^{(m)}$ computed according to the recursive formula:

$$\tilde{h}_{ij}^{(m)} = \tilde{h}_{ij}^{(m-1)} + \mu_{ij,m}\tilde{\varepsilon}_{ij}^{(m)}$$

falls within a newly oriented hyper-elliptical region because the shadow update step size $\mu_{ij,m}$ is a function of the hyper-ellipsoid-specification vector $\vec{\Lambda}_{ij}^{(m)}$, as described below with reference to FIG. 15. As shown in FIG. 14B, when the magnitude and direction of the shadow mismatch vector $\tilde{\varepsilon}_{ij}^{(m)}$ is large, as indicated by vector 1424, the shadow update step size $\mu_{ij,m}$ reduces the magnitude and changes the direction of the shadow mismatch vector $\tilde{\varepsilon}_{ij}^{(m)}$ as indicated by vector 1426.

As a result, the shadow-impulse-response vector $\tilde{h}_{ij}^{(m)}$ lies within a newly oriented hyper-elliptical region 1428.

Note that in other embodiments of the present invention, rather than computing a single shadow update step size $\mu_{ij,m}$ to update the shadow impulse-response vector, the magnitude of the shadow impulse-response vector can be changed to lie within the trust region by computing a second vector that is added to the shadow impulse-response vector $\tilde{h}_{ij}^{(m)}$ so that the resulting shadow impulse-response vector lies within the trust region.

FIG. 15 is a control-flow diagram for the routine "determine $\tilde{\varepsilon}_{ij}^{(m)}$" called in step 1404 in FIG. 14 and represents an embodiment of the present invention. In step 1501, an average spectrum of the frequency domain vector $\vec{X}_j^{(m)}$ is computed as follows:

$$\vec{S}_{i,xx}^{(m)} = (1-\beta)\vec{S}_{i,xx}^{(m-1)} \beta \vec{X}_i^{(m)} \circ \vec{X}_i^{(m)}$$

and an average spectrum of the frequency domain shadow-error vector $$\tilde{\vec{R}}_j^{(m)}$$

is computed as follows:

$$\vec{S}_{j,\tilde{r}\tilde{r}}^{(m)} = (1-\beta)\vec{S}_{j,\tilde{r}\tilde{r}}^{(m-1)} + \beta \tilde{\vec{R}}_j^{(m)} \cdot \tilde{\vec{R}}_j^{(m)}$$

where $$\vec{S}_{i,xx}^{(m)} = \begin{bmatrix} S_{i,xx}^{(m)}[0] \\ S_{i,xx}^{(m)}[1] \\ \vdots \\ S_{i,xx}^{(m)}[N-1] \end{bmatrix},$$

and $$\vec{S}_{j,rr}^{(m)} = \begin{bmatrix} S_{j,rr}^{(m)}[0] \\ S_{j,rr}^{(m)}[1] \\ \vdots \\ S_{j,rr}^{(m)}[N-1] \end{bmatrix},$$

The parameter $\beta$ is a weighting factor. In step 1502, the maximum energies computed in FIG. 11 are used to determine:

$$v_m = \frac{\sum_{i=1}^{I} M_{i,x}^{2(m)}}{\sum_{j=i}^{J} M_{i,y}^{2(m)}}$$

In steps 1503-1506, elements of an N-component, frequency domain, preconditioning vector $\vec{Q}_j^{(m)}$ are determined. In the for-loop beginning in step 1503, steps 1504-1506 are repeated for each frequency domain index k. In step 1504, the elements of the preconditioning vector $\vec{Q}_j^{(m)}$ are calculated as follows:

$$Q_j^{(m)}[k] = \frac{1}{\max\left\{\sum_{i=1}^{I} S_{i,xx}^{(m)}[k] + v_m S_{j,\tilde{r}\tilde{r}}^{(m)}[k], \lambda\right\}}$$

where k ranges from 0 to N−1. In step 1505, when k is less than N−1, control passes to step 1506, otherwise control passes to step 1507. In step 1506, the index k is incremented by the value "1." In step 1507, the vector $$\tilde{\vec{\varepsilon}}_{ij}^{(m)}$$

is computed as follows:

$$\tilde{\vec{\varepsilon}}_{ij}^{(m)} = Tr_L \cdot IFFT\left\{Q_j^{(m)} \cdot \vec{X}_i^{(m)} \cdot (\tilde{\vec{R}}_j^{(m)})^*\right\}$$

where $Tr_L$ is a truncation operator of size L, and $$\tilde{\vec{\varepsilon}}_{ij}^{(m)} = \begin{bmatrix} \tilde{\varepsilon}_{ij}[0] \\ \tilde{\varepsilon}_{ij}[1] \\ \vdots \\ \tilde{\varepsilon}_{ij}[L-1] \end{bmatrix}$$

FIG. 16 is a control-flow diagram for the routine "determine $\mu_{ij,m}$" called in step 1406 in FIG. 14 that represents an embodiment of the present invention. In step 1601, a parameter $\mu\_scale_{ij}^{(m)}$ is computed as follows:

$$\mu\_scale_{ij}^{(m)} = \sum_{n=0}^{L-1} \frac{(\tilde{\varepsilon}_{ij}^{(m)}[n])^2}{\Lambda_{ij}^{(m)}[n]}$$

In step 1602, when $\mu\_scale_{ij}^{(m)}$ is greater than the value "1," control passes to step 1603, otherwise control passes to step 1604. In step 1603, $\mu_{ij,m}$ is assigned the value $0.2/\sqrt{\mu\_scale_{ij}^{(m)}}$. In step 1604, $\mu_{ij,m}$ is assigned the value "0.2."

FIG. 17 is a control-flow diagram for the routine "determine $\gamma_{ij,m}$" called in step 1407 in FIG. 14 that represents an embodiment of the present invention. In step 1701, a parameter $\gamma\_scale_{ij}^{(m)}$ is computed as follows:

$$\gamma\_scale_{ij}^{(m)} = \frac{1}{L}\sum_{n=0}^{L-1} \frac{(\tilde{h}_{ij}^{(m)}[n])^2}{\Lambda_{ij}^{(m)}[n]}$$

In step 1702, when $E_{j,\tilde{r}}^2 \leq 0.9 E_{j,\tilde{r}}^2$ and after M time samples, control passes to step 1703, otherwise, control passes to step 1704. In step 1703, a parameter $c_{ij,m}$ is computed recursively as follows:

$$c_{ij,m} = \max\{c_{ij,m-1} - 4000, 400\}$$

In step 1704, the parameter $c_{ij,m}$ is computed recursively as follows:

$$c_{ij,m} = \max\{c_{ij,m-1} + 1, 40000\}$$

In step 1705, $\gamma_{ij,m}$ is assigned a value according to:

$$\gamma_{ij,m} = 5\left(\frac{v_{ij,m}}{v_{ij,m} + c_{ij,m}}\right)^{.85}$$

where $v_{ij,m}$ is computed in step 1502 of FIG. 15. In step 1706, when $\gamma\_scale_{ij}^{(m)}$ is greater than "1," control passes to step 1707. In step 1707, $\gamma_{ij,m}$ is assigned the value:

$$\gamma_{ij,m} = \frac{\gamma_{ij,m}}{\sqrt{\gamma\_scale_{ij}^{(m)}}}$$

Although the present invention has been described with respect to one embodiment, methods of the present invention are not limited to this embodiment. For example, in other embodiments of the present invention, acoustic echo cancellation may only be applied to a portion of the microphone digital signals. In particular, acoustic echo cancellation methods of the present invention may be applied to only those microphone-digital signals with amplitudes greater than some predetermined threshold rather than applying the method to all of the microphone-digital signals.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purposes of illustration and description. They are not intended to be exhaustive of or to limit the invention to the precise forms disclosed. Obviously, many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

The invention claimed is:

1. A method for reducing acoustic echoes in a plurality of microphone-digital signals transmitted from a first location to a second location, the method comprising:
    providing a plurality of loudspeakers and a plurality of microphones located at the first location, each of the plurality of microphones produces one of the plurality of microphone-digital signals that includes sounds produced at the first location and acoustic echoes produced by the plurality of loudspeakers;
    determining approximate impulse responses, each approximate impulse response corresponds to an echo path between each of the plurality of microphones and each of the plurality of loudspeakers;
    determining a plurality of approximate acoustic echoes, each approximate acoustic echo corresponds to convolving a digital signal played by one of the plurality of loudspeakers with a number of the approximate impulse responses; and
    reducing the acoustic echo in at least one of the microphone-digital signals based on the corresponding approximate acoustic echo;
    wherein determining an approximate impulse response further comprises identifying a type of audio transmission associated with each echo path as one of the following:
    audio signals produced at the first location only;
    audio signals produced at the second location only;
    audio signals simultaneously produced at the first location and the second location; and
    no audio signals produced at either the first location or the second location.

2. The method of claim 1 wherein reducing the acoustic echo in each of the microphone-digital signals further comprises determining a controlled digital signal as follows:

$$\hat{\vec{r}}_j^{(m)}[n] = Tr_{N_d} \cdot IFFT\left\{\vec{Y}_j^{(m)} - \sum_{i=1}^{I} \vec{X}_i^{(m)} \circ (\hat{\vec{H}}_{ij}^{(m-1)})^*\right\}$$

where
    $j \in \{1, \ldots J\}$ is a microphone index,
    $i \in \{1, \ldots, I\}$ is a loudspeaker index,
    $Tr_{N_d}$ is a truncation operator of a decision period length $N_d$,
    IFFT is inverse Fast-Fourier transform,
    "$\circ$" represents component-wise multiplication of two vectors,
    $\vec{Y}_j^{(m)}$ is a frequency domain microphone-digital signal,
    $\vec{X}_i^{(m)}$ is a frequency domain digital signal,
    $\hat{\vec{H}}_{ij}^{(m-1)}$ is a frequency domain, approximate-impulse-response vector, and $$\sum_{i=1}^{I} \vec{X}_i^{(m)} \circ (\hat{\vec{H}}_{ij}^{(m-1)})^*$$

is frequency domain, approximate acoustic echo.

3. The method of claim 2 wherein determining the frequency domain, approximate-impulse-response vector further comprises computing $$\hat{\vec{H}}_{ij}^{(m)} = FFT\{\hat{\vec{h}}_{ij}^{(m)}\}$$

where FFT is the Fast-Fourier transform, and $$\hat{\vec{h}}_{ij}^{(m)}$$

is an approximate impulse response vector depending the type of audio transmission.

4. The method of claim 3 wherein computing the approximate-impulse-response vector $$\hat{\vec{h}}_{ij}^{(m)}$$

depending the type of audio transmission further comprises, when no signals are transmitted between the first location and the second location or when signals are transmitted from first location to the second location, assigning:

$$\hat{\vec{h}}_{ij}^{(m)} = \hat{\vec{h}}_{ij}^{(m-1)}$$

where $$\hat{\vec{h}}_{ij}^{(m-1)}$$

is an approximate-impulse-response vector associated with a previous decision period identified by m−1.

5. The method of claim 3 wherein computing the approximate-impulse-response vector depending the type of audio transmission further comprises, when signals are simultaneously transmitted between the first location and the second location, selecting the approximate-impulse-response vector $$\hat{\vec{h}}_{ij}^{(m)}$$

form an impulse-response data structure with the K most recent approximate impulse responses with the highest signal to noise ratio $$\{\hat{\vec{h}}_{ij}^{(m_1)}, \ldots, \hat{\vec{h}}_{ij}^{(m_K)}\}.$$

6. The method of claim 5 wherein selecting the approximate-impulse-response) vector $\vec{h}_{ij}^{(m)}$ from the impulse response data structure further comprises selecting the approximate impulse-response based on one of:
which impulse-response vector has the largest corresponding echo return loss enhancement value; and
which approximate-impulse-response vector has been in the data structure the longest.

7. The method of claim 3 wherein computing the approximate-impulse-response vector further comprises when signals are transmitted from second location to the first location only employing a recursive formula given by:

$$\hat{\vec{h}}_{ij}^{(m)} = (1-\gamma_{ij,m})\hat{\vec{h}}_{ij}^{(m-1)} + \gamma_{ij,m}\tilde{\vec{h}}_{ij}^{(m)}$$

where $$\tilde{\vec{h}}_{ij}^{(m)}$$

is a shadow-impulse-response vector associated with a decision period identified by m, $$\hat{\vec{h}}_{ij}^{(m-1)}$$

is an approximate-impulse-response vector associated with a previous decision period identified by m−1, and $\gamma_{ij,m}$ is an impulse response step size.

8. The method of claim 7 wherein the impulse response step size further comprises computing:

$$\gamma_{ij,m} = 5\left(\frac{v_{ij,m}}{v_{ij,m}+c_{ij,m}}\right)^{.85}$$

where $$v_m = \frac{\sum_{i=1}^{I} M_{i,x}^{2(m)}}{\sum_{j=i}^{J} M_{i,y}^{2(m)}}, \text{ and}$$

for M decision periods and $E_{\tilde{r}}^2 \leq 0.9 E_{\hat{r}}^2$, $c_{ij,m}=\max\{c_{ij,m-1}-4000,400\}$, otherwise $c_{ij,m}=\max\{c_{ij,m-1}+1,40000\}$.

9. The method of claim 8 wherein the impulse response step size $\gamma_{ij,m}$ further comprises setting $$\gamma_{ij,m} = \frac{\gamma_{ij,m}}{\sqrt{\gamma\_scale_{ij}^{(m)}}}$$

when $\gamma\_scale_{ij}^{(m)}$ is greater than "1," where $$\gamma\_scale_{ij}^{(m)} = \frac{1}{L}\sum_{n=0}^{L-1}\frac{(\tilde{h}_{ij}^{(m)}[n])^2}{\Lambda_{ij}^{(m)}[n]},$$

$\tilde{h}_{ij}^{(m)}[n]$ is the nth element of the shadow-impulse vector $$\tilde{\vec{h}}_{ij}^{(m)},$$

and $\Lambda_{ij}^{(m)}[n]$ is the nth element of a trust region vector $\vec{\Lambda}_{ij}^{(m)}$.

10. The method of claim 7 wherein recursively computing the shadow-impulse-response vector further comprises employing a recursive formula given by:

$$\tilde{\vec{h}}_{ij}^{(m)} = \tilde{\vec{h}}_{ij}^{(m-1)} + \mu_{ij,m}\tilde{\vec{\varepsilon}}_{ij}^{(m)}$$

where $$\tilde{\vec{\varepsilon}}_{ij}^{(m)}$$

is a shadow-mismatch vector, $$\tilde{\vec{h}}_{ij}^{(m-1)}$$

is a shadow-impulse-response vector associated with a previous decision period identified by m−1, and $\mu_{ij,m}$ is a shadow update step size.

11. The method of claim 5 wherein computing the shadow-mismatch vector further comprises employing a recursive formula given by:

$$\tilde{\vec{\varepsilon}}_{ij}^{(m)} = Tr_L \cdot IFFT\left\{\vec{Q}_j^{(m)} \circ \vec{X}_i^{(m)} \circ \left(\tilde{\vec{R}}_j^{(m)}\right)^*\right\}$$

where m is an integer associated with a decision period,

L is a number of vector components,

IFFT is the inverse Fourier transform operator, $Tr_L$ is a truncation operator of size L, $\vec{Q}_j^{(m)}$ is a frequency domain, preconditioning operator, $\vec{X}_i^{(m)}$ is a frequency domain vector corresponding to the audio signal, and $$\tilde{\vec{R}}_j^{(m)}$$

is a frequency domain, shadow error vector.

12. The method of claim 11 wherein components of the frequency domain, preconditioning operator further comprise:

$$Q_j^{(m)}[k] = \frac{1}{\max\left\{\sum_{i=1}^{I} S_{i,xx}^{(m)}[k] + v_m S_{j,\tilde{r}\tilde{r}}^{(m)}[k], \lambda\right\}}$$

where $S_{i,xx}^{(m)}[k]$ is a component of an average spectrum of the frequency domain vector $\vec{X}_i^{(m)}$ given by $S_{i,xx}^{(m)}=(1-\beta)S_{i,xx}^{(m-1)}+\beta\vec{X}_i^{(m)}\circ\vec{X}_i^{(m)}$, $S_{j,\tilde{r}\tilde{r}}^{(m)}[k]$ is a component of an average spectrum of the frequency domain shadow error vector $$\tilde{\vec{H}}_{ij}^{(m-1)}$$

given by $$\vec{S}_{j,\tilde{r}\tilde{r}}^{(m)} = (1-\beta)\vec{S}_{j,\tilde{r}\tilde{r}}^{(m-1)} + \beta\tilde{\vec{R}}_j^{(m)}\circ\tilde{\vec{R}}_j^{(m)},$$

λ is a stabilizing constant, $$v_m = \frac{\sum_{i=1}^{I} M_{i,x}^{2(m)}}{\sum_{j=i}^{J} M_{j,y}^{2(m)}},$$

$M_{i,x}^{2\ (m)}$ is a maximum energy associated with the digital signal, and $M_{j,y}^{2\ (m)}$ is a maximum energy associated with the microphone-digital signal.

13. The method of claim 5 wherein the shadow update step size $\mu_{ij,m}$ further further comprises setting $\mu_{ij,m}$=0.2 when $\mu\_scale_{ij}^{(m)}>1$, otherwise $$\mu_{ij,m} = \frac{0.2}{\sqrt{\mu\_scale_{ij}^{(m)}}}$$

where $$\mu\_scale_{ij}^{(m)} = \sum_{n=0}^{L-1} \frac{(\tilde{\varepsilon}_{ij}^{(m)}[n])^2}{\Lambda_{ij}^{(m)}[n]}$$

$\tilde{\epsilon}_{ij}^{(m)}[n]$ is the nth element of the shadow-mismatch vector $$\tilde{\vec{\varepsilon}}_{ij}^{(m)},$$

and $\Lambda_{ij}^{(m)}[n]$ is the nth element of a trust region vector $\vec{\Lambda}_{ij}^{(m)}$.

14. The method of claim 13 wherein recursively computing a trust region vector further comprises employing a recursive formula given by:

$$\vec{\Lambda}_{ij}^{(m)} = (1-\eta)\vec{\Lambda}_{ij}^{(m-1)} + \eta\hat{\vec{h}}_{ij}^{(m-1)} \circ \hat{\vec{h}}_{ij}^{(m-1)}$$

where m is an integer associated with a decision period, $\vec{\Lambda}_{ij}^{(m-1)}$ is the trust region vector associate with a previous decision period identified by m−1, $$\hat{\vec{h}}_{ij}^{(m-1)}$$

is an approximate-impulse-response vector associated with a previous decision period identified by m−1, ∘ represents component wise multiplication, and η is a weighting factor.

15. A system for reducing acoustic echoes in a plurality of microphone-digital signals transmitted from a first location to a second location, wherein the first location includes a plurality of loudspeakers and a plurality of microphones, the system comprising:

a computer system that runs a computer program; and
the computer program
  determines approximate impulse responses, each approximate impulse response corresponds to an echo path between each of the plurality of microphones and each of the plurality of loudspeakers;
  determines a plurality of approximate acoustic echoes, each approximate acoustic echo corresponds to convolving a digital signal played by one of the plurality of loudspeakers with a number of the approximate impulse responses; and
  reduces the acoustic echo in each of the microphone-digital signals based on the corresponding approximate acoustic echo;
the determines the approximate impulse responses comprises identifying the type of audio transmission associated with each acoustically coupled loudspeaker and microphone by: determining whether audio signals are produced at the first location only;
  determining whether audio signals are produced at the second location only;
  determining whether audio signals are simultaneously produced at the first location and the second location; and
  determining whether no audio signals are produced at either the first location or the second location.

16. The method of claim 15 wherein reduces the acoustic echo in each of the microphone-digital signals further comprises computing a controlled digital signal as follows:

$$\hat{r}_j^{(m)}\{N\} + Tr_{N_d} \cdot IFFT\left\{\vec{Y}_j^{(m)} - \sum_{i=1}^{I} \vec{X}_i^{(m)} \circ (\hat{\vec{H}}_{ij}^{(m-1)})^*\right\}$$

where
  $j \in \{1, \ldots J\}$ is a microphone index,
  $i \in \{1, \ldots, I\}$ is a loudspeaker index,
  $Tr_{N_d}$ is a truncation operator of a decision period length $N_d$,
  IFFT is inverse Fast-Fourier transform,
  "$\circ$" represents component-wise multiplication of two vectors,
  $\vec{Y}_j^{(m)}$ is a frequency domain microphone-digital signal,
  $\vec{X}_i^{(m)}$ is a frequency domain digital signal,
  $\hat{\vec{H}}_{ij}^{(m-1)}$ is a frequency domain, approximate-impulse-response vector, and $$\sum_{i=1}^{I} \vec{X}_i^{(m)} \circ (\hat{\vec{H}}_{ij}^{(m-1)})^*$$

is frequency domain, approximate acoustic echo.

17. A method for determining audio transmission types for a plurality of acoustically coupled loudspeakers and microphones of a multichannel audio communication system, the method comprising:
  providing a plurality of digital signals transmitted to the loudspeakers and a plurality of microphone digital signals transmitted from microphones;
  computing a plurality of average square energies associated with each of the plurality of digital signals, each of the plurality of microphone digital signals, and each of a plurality noise digital signals;
  computing a plurality of maximum square energies associated with each of the digital signals and a plurality of maximum square energies associated with each of the microphone digital signals;
  computing a plurality of energy variances associated with each of the average square energies of the digital signals, the plurality of microphone digital signals, and the plurality of noise digital signals; and
  computing the audio transmission type for each acoustically coupled loudspeaker and microphone by comparing the average square energies, the maximum square energies, and the energy variances.

18. The method of claim 17, wherein computing the average square energy of the digital signals, the microphone digital signals, and the noise further comprises:

$$E_{i,x}^{2(m)} = \|\vec{x}_i^{(m)}[n]\|^2,$$

$$E_{j,y}^{2(m)} = \|\vec{y}_j^{(m)}[n]\|^2,$$

$$E_{j,\hat{r}}^{2(m)} = \left\|\hat{\vec{r}}_j^{(m)}[n]\right\|^2, \text{ and}$$

respectively, where $$\vec{x}_i^{(m)}[n] = \begin{bmatrix} x_i^{(m)}[n] \\ x_i^{(m)}[n-1] \\ \vdots \\ x_i^{(m)}[n-(L+P-1)] \end{bmatrix},$$

$$\vec{y}_j^{(m)}[n] = \begin{bmatrix} y_j^{(m)}[n] \\ y_j^{(m)}[n-1] \\ \vdots \\ y_j^{(m)}[n-(P-1)] \end{bmatrix},$$

$$\hat{\vec{r}}_j^{(m)}[n] = \begin{bmatrix} \hat{r}_j^{(m)}[n] \\ \hat{r}_j^{(m)}[n-1] \\ \vdots \\ \hat{r}_j^{(m)}[n-(N_d-1)] \end{bmatrix},$$

n represents a time sample index, L represents the number of components comprising an impulse response associated with detecting the digital signal, and P represents the number of points in the microphone digital signal, $j \in \{1, \ldots J\}$ is a microphone index, and $i \in \{1, \ldots, I\}$ is a loudspeaker index.

* * * * *

UNITED STATES PATENT AND TRADEMARK OFFICE
CERTIFICATE OF CORRECTION

PATENT NO. : 8,204,249 B2
APPLICATION NO. : 11/799266
DATED : June 19, 2012
INVENTOR(S) : Majid Fozunbal It is certified that error appears in the above-identified patent and that said Letters Patent is hereby corrected as shown below:

In column 31, line 37, in Claim 6, delete "response)" and insert -- response --, therefor.

In column 32, line 5, in Claim 8, delete "size" and insert -- size $\gamma_{ij,m}$ --, therefor.

In column 33, line 24, in Claim 11, delete "Fourier" and insert -- Fast-Fourier --, therefor.

In column 33, line 58, in Claim 12, delete " $\hat{\tilde{H}}_{ij}^{(m-1)}$ " and insert -- $\hat{\tilde{R}}_{j}^{(m)}$ --, therefor.

In column 34, line 11, in Claim 12, delete "$M_{i,x}^{2\ (m)}$" and insert -- $M_{i,x}^{2(m)}$ --, therefor.

In column 34, line 13, in Claim 12, delete "$M_{j,y}^{2\ (m)}$" and insert -- $M_{j,y}^{2(m)}$ --, therefor.

In column 34, line 16, in Claim 13, delete "further further" and insert -- further --, therefor.

In column 35, line 16, in Claim 15, before "determines the" delete "the".

In column 35, lines 33-34, in Claim 16, delete

" $\hat{\tilde{r}}_{j}^{(m)}\{N\} + Tr_{N_d} \cdot IFFT\left\{\bar{Y}_{j}^{(m)} - \sum_{i=1}^{I} \bar{X}_{i}^{(m)} \circ (\hat{\tilde{H}}_{ij}^{(m-1)})^{*}\right\}$ " and insert -- $\hat{\tilde{r}}_{j}^{(m)}[n] = Tr_{N_d} \cdot IFFT\left\{\bar{Y}_{j}^{(m)} - \sum_{i=1}^{I} \bar{X}_{i}^{(m)} \circ (\hat{\tilde{H}}_{ij}^{(m-1)})^{*}\right\}$ --, therefor.

Signed and Sealed this
Twenty-ninth Day of January, 2013

David J. Kappos
*Director of the United States Patent and Trademark Office*